United States Patent
Wedmore et al.

(10) Patent No.: US 11,941,617 B2
(45) Date of Patent: Mar. 26, 2024

(54) COMPUTER-BASED SYSTEMS CONFIGURED TO PROVIDE PRE-STAGED TRANSACTIONS VIA LOCKERS AND METHODS OF USE THEREOF

(71) Applicant: Capital One Services, LLC, McLean, VA (US)

(72) Inventors: Amy Wedmore, McLean, VA (US); Steven Almanzar, McLean, VA (US); Alia Ward, McLean, VA (US); Elliot Brown, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 164 days.

(21) Appl. No.: 17/108,954

(22) Filed: Dec. 1, 2020

(65) Prior Publication Data

US 2022/0172202 A1 Jun. 2, 2022

(51) Int. Cl.
| | |
|---|---|
| *G06Q 20/38* | (2012.01) |
| *G06Q 20/34* | (2012.01) |
| *G06Q 20/40* | (2012.01) |
| *G07C 9/00* | (2020.01) |

(52) U.S. Cl.
CPC ....... *G06Q 20/38215* (2013.01); *G06Q 20/34* (2013.01); *G06Q 20/4014* (2013.01); *G06Q 20/4015* (2020.05); *G07C 9/00912* (2013.01); *G06Q 2220/00* (2013.01)

(58) Field of Classification Search
CPC ......... G06Q 20/38215; G06Q 20/4015; G06Q 20/34; G06Q 20/4014
See application file for complete search history.

(56) References Cited

U.S. PATENT DOCUMENTS

| | | | |
|---|---|---|---|
| 9,251,252 B2 | 2/2016 | Naaman et al. | |
| 9,591,086 B2 | 3/2017 | Brezina et al. | |
| 11,430,069 B1* | 8/2022 | Pedersen | G06K 9/6255 |
| 2002/0073011 A1 | 6/2002 | Brattain et al. | |
| 2002/0107991 A1 | 8/2002 | Maguire et al. | |
| 2014/0180817 A1* | 6/2014 | Zilkha | G06F 16/24575 |
| | | | 705/14.55 |
| 2016/0267438 A1* | 9/2016 | Sobol | G06Q 40/02 |
| 2017/0293937 A1 | 10/2017 | Gilliam | |
| 2018/0336612 A1* | 11/2018 | Bullard, III | H04L 9/3234 |
| 2018/0350177 A1* | 12/2018 | Dautz | G06Q 20/327 |
| 2019/0362302 A1* | 11/2019 | Deemter | G07F 17/0014 |
| 2020/0389551 A1* | 12/2020 | Vaughn | H04M 3/42059 |

* cited by examiner

*Primary Examiner* — Jacob C. Coppola
(74) *Attorney, Agent, or Firm* — Greenberg Traurig, LLP

(57) ABSTRACT

Systems and methods of providing pre-staged transactions via lockers are disclosed. In one embodiment, an exemplary computer-implemented method may comprise receiving a request from a user to perform a pre-staged transaction at a physical location; generating a first token based on the pre-staged transaction; transmitting first token to an app executing on a mobile device associated with the user; assigning a locker from a plurality of lockers positioned within the physical location; receiving the first token from the app executing on the mobile device of the user to initiate access to the locker when the user is within the physical location; authenticating the user based on the first token; transmitting, upon successful authentication of the user, a second token to the app executing on the mobile device; and causing, in response to receiving the second token at the locker, the locker to unlock.

15 Claims, 13 Drawing Sheets

COMPUTER-BASED SYSTEMS CONFIGURED TO PROVIDE PRE-STAGED TRANSACTIONS VIA LOCKERS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more novel technological applications involving pre-staged transactions configured for various functionality such as fulfillment of transactions via lockers, and/or including aspects related to authentication, modifying the pre-staged transactions, and/or performing other features.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications.

SUMMARY OF DESCRIBED SUBJECT MATTER

In some embodiments, the present disclosure provides various exemplary technically improved computer-implemented methods providing pre-staged transactions via lockers, such as a method including the steps such as:
receiving, by a computing device, a request from a user to perform a pre-staged transaction at a physical location;
generating, by the computing device, a first token based on the pre-staged transaction, the first token comprising: a transaction detail of the pre-staged transaction, an operator identifier identifying an operator handling the request, at least one first authentication factor associated with the user, and an expiration time;
designating, by the computing device, a status of the pre-staged transaction as being in a first state;
transmitting, by the computing device, the first token to an app executing on a mobile device associated with the user, the first token being valid prior to the expiration time, when the user is outside of the physical location when the first token is transmitted to the app;
assigning, by the computing device, a locker from a plurality of lockers positioned within the physical location;
instructing, by the computing device, the operator to access the locker to prepare the locker to be utilized to perform the pre-staged transaction by the user;
tracking, by the computing device, an operator activity performed by the operator in preparing the locker to be utilized to perform the pre-staged transaction by the user;
receiving, by the computing device, the first token from the app executing on the mobile device of the user to initiate access to the locker when the user is within the physical location;
authenticating, by the computing device, the user based on the first token;
transmitting, by the computing device, upon successful authentication of the user, a second token to the app executing on the mobile device, the second token including locker identifying information of the locker, and credential information to access the locker;
causing, by the computing device and in response to receiving the second token at the locker, the locker to unlock;
updating, by the computing device and upon detecting an access to the locker by the user, the status of the pre-staged transaction as being in a second state; and
utilizing, by the computing device, a database to track the status of the pre-staged transaction, the first token, the second token, a status of the locker, and the operator activity.

In some embodiments, the present disclosure provides various exemplary technically improved computer-implemented methods providing pre-staged transactions, such as a method including at least the steps of:
receiving, by a computing device, a request from a user to pre-stage a transaction, the request including transaction details relating to the transaction;
processing, by the computing device, the transaction based on the request to generate a first token, the first token comprising data elements identifying at least: a transaction detail of the transaction, an operator identifier identifying an operator handling the request, at least one first authentication factor associated with the user, and an expiration time;
transmitting, by the computing device, the first token to a mobile device of the user;
generating, by the computing device, a second token based on detecting a presence of the mobile device of the user at a physical location corresponding to the first token, the user visiting the physical location to fulfill the transaction;
authenticating, by the computing device, the user based on the first token and the second token;
allowing, by the computing device and in response to successful authentication of the user, the transaction to be fulfilled by the user; and
updating, by the computing device, a status of the transaction upon the transaction being completed by the user.

In some embodiments, the present disclosure provides various exemplary technically improved computer-implemented systems providing pre-staged transactions via lockers, such as a system including at least the following components of:
a plurality of lockers positioned within a physical location;
one or more processors; and
a memory in communication with the one or more processors and storing instructions that, when executed by the one or more processors, cause the system to:
receive a request from a user to perform a pre-staged transaction at the physical location;

generate a first token based on the pre-staged transaction, the first token comprising: a transaction detail of the pre-staged transaction, an operator identifier identifying an operator handling the request, at least one first authentication factor associated with the user, and an expiration time;

designate a status of the pre-staged transaction as being in a first state;

transmitting the first token to an app executing on a mobile device associated with the user, the first token being valid prior to the expiration time, when the user is outside of the physical location when the first token is transmitted to the app;

assign a locker from the plurality of lockers;

instruct the operator to access the locker to prepare the locker to be utilized to perform the pre-staged transaction by the user;

track an operator activity performed by the operator in preparing the locker to be utilized to perform the pre-staged transaction by the user;

receive the first token from the app executing on the mobile device of the user to initiate access to the locker when the user is within the physical location;

authenticate the user based on the first token;

transmit, upon successful authentication of the user, a second token to the app executing on the mobile device, the second token including locker identifying information of the locker, and credential information to access the locker;

cause, in response to receiving the second token at the locker, the locker to unlock;

update, upon detecting an access to the locker by the user, the status of the pre-staged transaction as being in a second state; and utilize a database to track the status of the pre-staged transaction, the first token, the second token, a status of the locker, and the operator activity.

In some embodiments, the present disclosure also provides exemplary technically improved computer-based systems, and computer-readable media, including computer-readable media implemented with and/or involving one or more software applications, whether resident on transaction cards, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
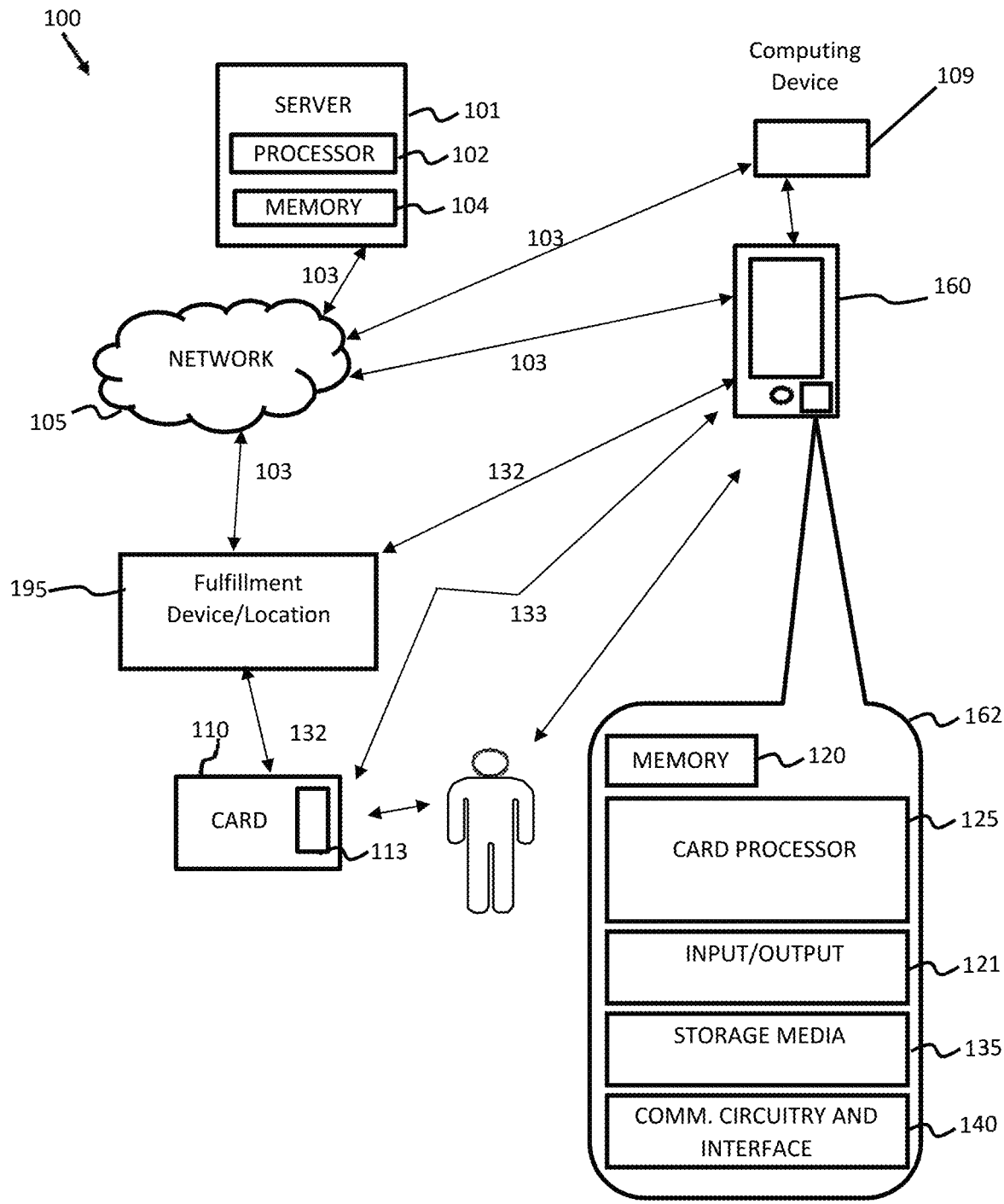
FIG. 1 is a block diagram of an exemplary system and/or platform involving pre-staging transactions via lockers, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, various exemplary computer-based systems and methods of the present disclosure allow for improving pre-staged transactions such as, but not limited to, via the use of lockers, the use of automatic recommendations, and the use of dynamically programmed shifting mechanisms, and/or other features. In one embodiment, an exemplary computer-implemented method of the present disclosure may include, in response to a transaction pre-staged at a physical location, generating a first token based on the pre-staged transaction; transmitting the first token to an app executing on a mobile device associated with a user; assigning a locker from a plurality of lockers positioned within the physical location; instructing an operator to access the locker to prepare the locker to be utilized to perform the pre-staged transaction by the user; tracking an operator activity performed by the operator in preparing the locker to be utilized to perform the pre-staged transaction by the user; receiving the first token from the app executing on the mobile device of the user to initiate access to the locker when the user is within the physical location; authenticating the user based on the first token, transmitting, upon successful authentication of the user, a second token to the app executing on the mobile device, the second token including locker identifying information of the locker, and credential information to access the locker; causing, in response to receiving the second token at the locker, the locker to unlock; and updating, upon detecting an access to the locker by the user, the status of the pre-staged transaction as being in a second state.

In another embodiment, an exemplary computer-implemented method of the present disclosure may include receiving a request from a user to pre-stage a transaction, the request including transaction details relating to the transaction; processing the transaction based on the request to generate a first token, the first token comprising data elements identifying at least: a transaction detail of the transaction, an operator identifier identifying an operator handling the request, at least one first authentication factor associated with the user, and an expiration time; transmitting the first token to a mobile device of the user; generating a second token based on detecting a presence of the mobile device of the user at a physical location (e.g., a venue) corresponding to the first token; authenticating the user based on the first token and the second token; and allowing, in response to successful authentication of the user, the transaction to be fulfilled by the user.

Various embodiments disclosed herein may be implemented in connection with one or more entities that provide, maintain, manage, or otherwise offer services via pre-staging transactions. In some embodiments, an exemplary entity may be a financial service entity that provides, maintains, manages, or otherwise offers financial services. Such financial service entity may be a bank, credit card issuer, or any other type of financial service entity that generates, provides, manages, and/or maintains financial service accounts that entail providing a transaction to one or more customers, a transaction card configured for use at a transacting device (e.g., a locker, an ATM, a bank kiosk, a teller device, a POS (point-of-sale, point-of-service, etc.) device) to access an associated financial service account. Financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary computer-based system 100 illustrating aspects of improved, pre-staged transactions via fulfillment devices, and/or other components, in accordance with one or more embodiments of the present disclosure. In the illustrative embodiment shown, system 100 may include at least one server 101, at least one wireless mobile device 160, at least one transaction card 110, and at least one fulfillment device (or location) 195, which may all communicate 103 over at least one communication network 105. In the example of FIG. 1, fulfillment device 195 may be a locker, an automated teller machine (ATM), a bank kiosk, a teller device, a comparable POS device, or other terminal or computer that processes pre-staged transactions to fulfillment or a further transacting status. In accordance with embodiments and advantages described herein, such as to attract more transactions at fulfillment device 195 and render more satisfactory user experience, the business or merchant associated with the fulfillment device 195 and typically a financial institution, such as a credit card company that has issued the card 110 to the user, have incentive and desire to enhance the fulfillment device to provide convenient, secure, and configurable accessibility via the fulfillment device 195.

Embodiments herein relate to systems and methods whereby server 101 can receive a request from a user to pre-stage a transaction for fulfillment or further transaction(s) via the fulfillment device 195, according to user-specified transaction aspects such as a time (e.g., an preferred time, time window around lunch time or after hours), a physical location, a fulfillment modality (e.g., a locker, an ATM, a teller device), a fulfilling user (e.g., a user other than the one who pre-stages the transaction), and so on. In doing so, the server can instruct the fulfillment device 195 to be prepared (e.g., manually by an operator of the service provider, the bank, the merchant, the business, or automatically by automation mechanisms such as robotic arms, conveyance belts, drones, robots, or a combination thereof) to stage the transaction up to the point for completion or further transaction, pending fulfillment conditions such as a physical presence, and/or authentication/verification of the user being satisfied.

Accordingly, in some embodiments, at least part of the functionality of the conventional one-stop transactions against the accounts of users is "shifted" or "split" into multiple phases, with various configurable aspects in terms of a time, a physical location, a fulfillment modality, a fulfilling user, and the like. Here, for example, embodiments herein may also leverage the fact that the user who intends to pre-stage and/or fulfill transactions is often, in addition to being in possession of the transaction card, near to the user's wireless device (e.g., mobile device), such as a smartphone, smartwatch, tablet, iPAD, laptop computer, wearable device, and the like, for example, and may use functionality associated with the user's wireless device and the transaction card, including the interaction between the two, as a part of various transacting processes set forth herein.

Referring to FIG. 1, server 101 may include at least one processor 102, and a memory 104, such as random-access memory (RAM). In some embodiments, server(s) 101 may be associated with one or more entities that are stakeholders to transactions at the fulfillment device 195, such as the business or merchant, one or more financial services providers, such as an issuer of a credit card, debit card, or other transaction card associated with the pre-staged transaction. In other embodiments, server(s) 101 may be associated with one or more entities that are in partnership or otherwise agreement with the one or more stakeholders to transactions pre-staged for performance at the fulfillment device 195. For example, the server(s) may be associated with a foreign financial institution that provides access to its fulfillment devices to users holding accounts associated with a domestic bank or credit card company, via various fund transfer protocols.

In the embodiment shown in FIG. 1, an illustrative fulfillment device 195 may be a locker of a plurality of locker, an ATM, a teller device, a bank kiosk, a POS device, and/or any computing device capable of allowing the user to fulfill the pre-staged transaction. According to various aspects of the disclosure, the fulfillment device 195 may be configured with one or more of: processing components and/or computer readable media, memory, communication circuitry and/or interfaces, and card reading component. Such card reading component(s) may be configured to read information from a transaction card 110; for example, the card reading component may comprise one or more of a magnetic stripe reader, a chip reader, and/or a first near field communication (NFC) component. Communication circuitry and/or interfaces may comprise at least one wireless device transceiver component configured to communicate, before and/or during the execution of a pre-staged transaction, with a mobile device 160 presented for access, the mobile device transceiver component comprising a second NFC component. In some embodiments, the transacting device may further comprise one or more cameras, and/or one or more biometric sensors. More details with regard to exemplary fulfillment device 195 are described with connection to FIGS. 2A-2B, below.

In some embodiments, the transaction card 110 may be a traditional credit card, debit card, or a smart card, an RFID card, and may be formed from plastic, metal, or any other suitable material. Transaction card 110 may include card circuitry 113 formed directly therein, and/or disposed therein by gluing, bonding or by any suitable adhesion method for affixing circuitry to the material of transaction card 110. Card circuitry may be configured to utilize any hardwired circuitry. Card circuitry may be implemented as one or more integrated circuit chips, and/or electronic devices, electrically interconnected and bonded to one or more circuit boards, for example. In some embodiments, the transaction card 110 may be a contactless card including a presto chip.

Mobile device 160, such as a smart phone or other portable or wireless or wearable electronic device, may include mobile device circuitry 162. Mobile device circuitry 162 may include a mobile device processor 125, memory 120 such as RAM, computer-readable media 135, communication circuitry and interface 140, and/or any input and/or output device 121, such as a touchscreen display. The memory 120 may store code that, when executed by processor, may cause processor 125 to implement one or more aspects of various operations and schemes relating to pre-staged transactions herein, including those involving: (1) executing a software application on the mobile device 160, such as for transmitting a request to the server to pre-stage a transaction, to receive notifications regarding the pre-staged transaction, to modify/cancel a pre-staged transaction, and receiving tokens that are generated by the server based on the pre-staged transaction, (2) authenticating the user (e.g., a fulfilling user) using biometrics (e.g., fingerprints, voice recognition, facial recognition, etc.), (3) authenticating the user using the tokens generated for the pre-staged transaction, (4) detecting a geo-location of the mobile device, (5) detecting a presence of the user in proximity to the physical location associated with fulfilling the pre-staged transaction, and/or (6) executing the software application on the mobile device 160, such as for receiving fulfillment device access information associated with the pre-staged transaction (e.g., tokens including locker identification information, credential information of a passcode and the like) to access fulfillment device 195, upon the successful authentication of the fulfilling user.

The exemplary system of FIG. 1 may include an exemplary computing device 109, such as at least one client computing device, associated with at least one user, such as an owner of the transaction card 110, or the user who sends a request to the server 101 to pre-stage a transaction. In some embodiments, the exemplary computing device 109 may be configured to execute, among other programs, an application such as for transmitting a request to the server to pre-stage a transaction, to modify/cancel a pre-staged transaction, and receive tokens that are generated by the server based on the pre-staged transaction. In some embodiments, a requesting user may pre-stage a transaction at the computing device 109, and subsequently, a fulfilling user may utilize the mobile device 160 to fulfill the pre-staged transaction. In some embodiments, the requesting user and the fulfilling user are the same user; while in other embodiments, the requesting user and the fulfilling user are different users.

Various embodiments associated with FIG. 1 and related disclosure herein solve a technical problem of improving transactions with expanded configurability in various aspects such as timing, location, transacting modality, transacting user, and so on, in a secure manner. Various embodiments are implemented based on features and functionality including pre-staging transactions, performing pre-staged transactions via fulfillment devices (e.g., a locker), as well as various mobile device based solutions that include features and functionality for dynamically modifying various aspects of a pre-staged transaction. Various features and functionality disclosed herein may be utilized in connection with improving service accessibility, fulfillment device accessibility, and/or authentication and security processes that involve the use of fulfillment device 195 in connection with mobile device 160, by use of a transaction card, while executing a software application on the mobile device 160 for requesting a pre-staged transaction, recommending a pre-staged transaction, dynamic notifications for modifying the pre-staged transaction, authenticating the user for the fulfillment of the pre-staged transaction. In other embodiments, various information gathered via the mobile device 160 and/or the device or user may be relayed back to server 101 (e.g., server processor 102) so as to perform more detailed presence detection, token generation, user authentication, and user's historical transaction based recommendation to pre-stage transactions.

In some embodiments, an initial authentication for pairing the transaction card 110 with the mobile device 160 may be implemented by the user contacting the entity from the user's mobile device to initially authorize the pairing of transaction card 110 with mobile device 160 so as to receive pairing approval. In other embodiments, the pairing and/or unpair processes between the transaction card and the mobile device may occur automatically and seamlessly such as without any action on the part of the user, particularly if the same mobile device had been previously paired with the same transaction card in the past. In yet other embodiments, proximity multi-factor authentication (MFA) may use various techniques, such as biometrics (e.g., fingerprint, voice recognition, etc.) and/or a password entered by the user and/or a swiping of the mobile device screen by a finger of the user and/or the proximity of the transaction card to the mobile device or any client device, for example, to pair or unpair the transaction card with the mobile device or client. In some embodiments, the mobile device 160 may be also be paired with a fulfillment device such as an ATM. In some embodiments, proximity multi-factor authentication (MFA) may use various techniques, such as biometrics (e.g., fingerprint, voice recognition, etc.) and/or a password entered by the user and/or a swiping of the mobile device screen by a finger of the user and/or the proximity of the mobile device to the fulfillment device, for example, to pair or unpair the mobile device with the fulfillment device.

Figure 2A:
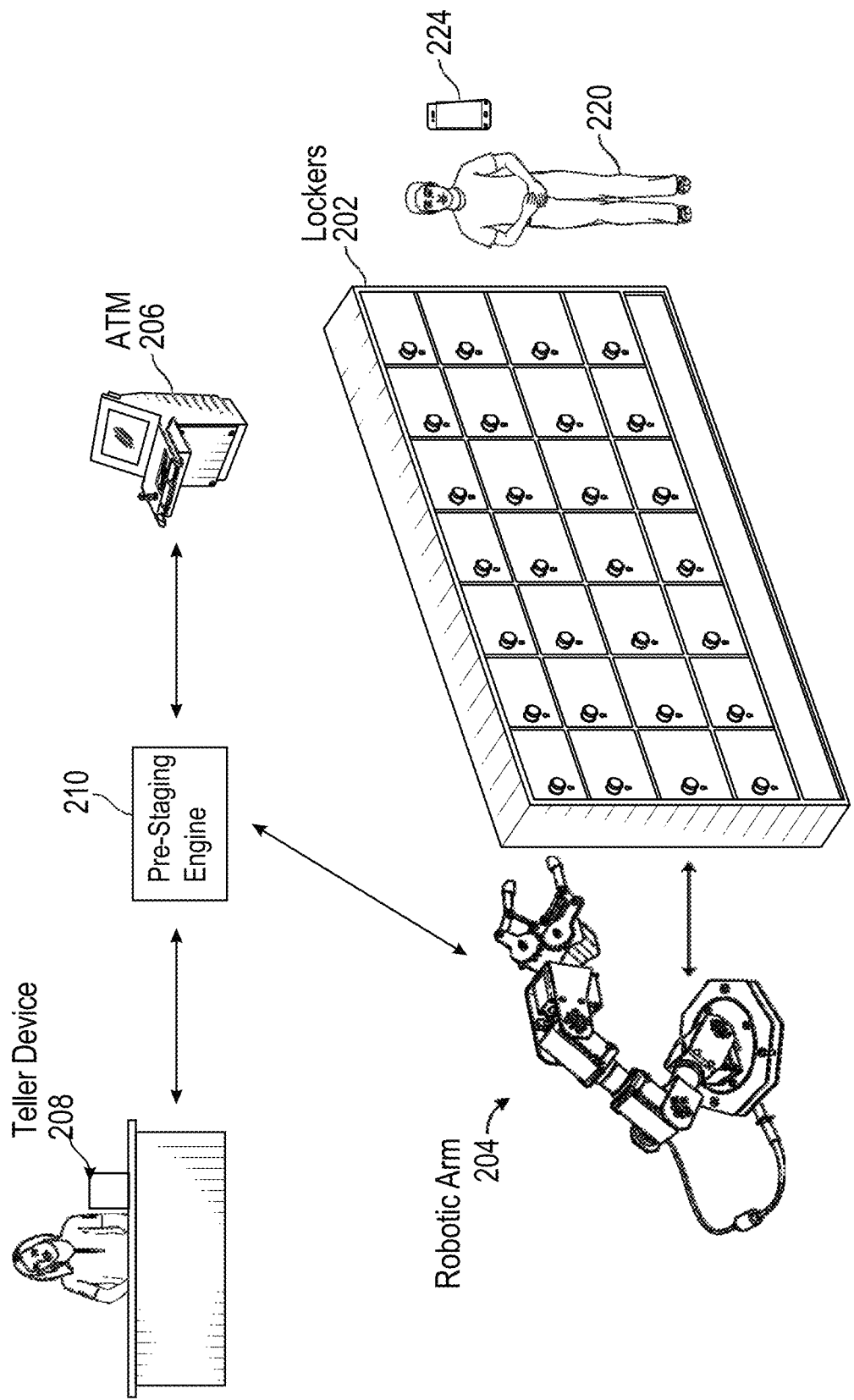
FIG. 2A is a block diagram of an exemplary system and/or platform involving locker features for performing pre-staged transactions, consistent with exemplary aspects of certain embodiments of the present disclosure.

FIG. 2A is a block diagram of an exemplary system and/or platform involving lockers for performing pre-staged transactions, consistent with exemplary aspects of certain embodiments of the present disclosure. According to some embodiments, a pre-staged transaction may be scheduled to be fulfilled or further transacted via a variety of fulfillment devices. As shown herein FIG. 2A, a pre-staging engine 210 may be configured to communicate with one or more of: a plurality of lockers 202, an ATM 206, and a teller device 208, in response to handling a request to pre-stage a transaction. In some embodiments, the pre-staging engine 210 may be implemented at the server 101 of FIG. 1. In some embodiments, the pre-staging engine 210 may be communicatively connected to the plurality of lockers 202, ATM 206, and teller device 208 via a network (not shown) such as a wired and/or wireless network. In implementations, such network may include a local area network (LAN)/wide area networks (WAN), cellular wireless network, Wi-Fi network, and so on. In some embodiments, the pre-staging engine 210 may be in communication with one or more automation mechanisms to automatically instruct and prepare a unit of the lockers 202 for being utilized by a user to fulfill or further transact a pre-staged transaction. Here, in this example, a robotic arm 204 is shown to be configured to operate the lockers 202 according to instructions from the pre-staging engine 210. In other examples, such automation mechanisms may include a conveyance belt, a drone, a drive, a robot, and the like. In various embodiments, the automation mechanisms may be configured in a centralized manner, a distributed manner, or a combination thereof. For example, the robotic arm 204 may be configured to operate a single locker, a subset of lockers, or the entire collection of lockers in the bank of lockers 202. In other words, automation mechanisms may be configured to automate operations at a locker level, a group of locker level, or a locker bank level. In some examples, a human operator may be instructed by the pre-staging engine 210 to prepare and maintain the lockers 202 as well. In various embodiments, the activities of the operator (e.g., human operator and automated operator) may be recorded, monitored, and tracked in connection with the pre-staged transaction. Although only one bank of lockers 202, one ATM 206, one teller device 208, one robotic arm 204 are illustrated herein, it should be understood that any number of lockers, ATMs, teller devices, and robotic arms can be included in the fulfillment system.

According to some embodiments, after a transaction is pre-staged for performance via one of the fulfillment devices (e.g., lockers 202, ATM 206, and teller device 208), a user 220 may be allowed to access the fulfillment devices, upon successful authentication and verification, using a mobile device 224 and/or a transaction card (not shown) of the user. In other embodiments, the user may also operate the application executing on the mobile device to modify the pending pre-staged transaction. For example, the user may operate the application to delay a time window associated with the access to the fulfillment device, change a location associated with the pre-staged transaction, designate a different user (e.g., a user other than the one previously designated for fulfilling the pre-staged transaction), and/or change a fulfillment device for performing the pre-staged transaction. In one example, the user may pre-stage a cashing a check transaction to be performed at an ATM of a location, but only realize that a line has been formed at the ATM when the user shows up at the location. The user may modify the pre-staged transaction to an ATM at another location, to a locker instead, or to a teller device instead. In another example, the user may have previously pre-staged a pick-up of a large sum of cash bills from a locker and have to modify the pick-up time window associated with the pending transaction to a later time at night. For security concerns, the user may further modify the pending transaction to shift the fulfillment modality to a teller device at a time during business hours so that the user can fetch the cash bills over the counter with minimized security risks.

Figure 2B:
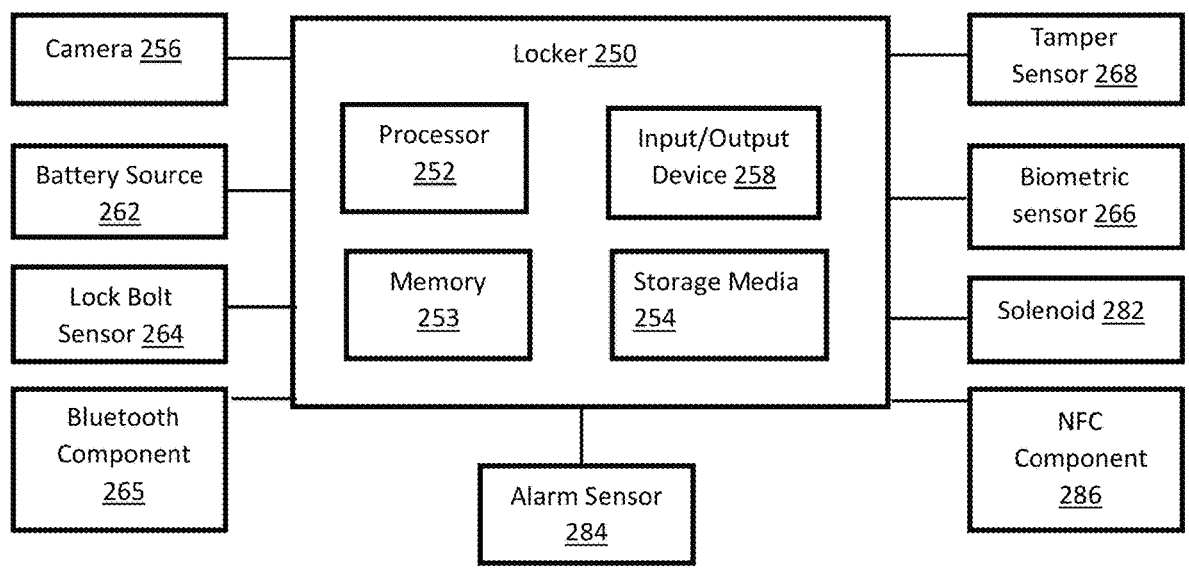
FIG. 2B is a block diagram of an exemplary locker for performing pre-staged transactions, consistent with exemplary aspects of certain embodiments of the present disclosure.

FIG. 2B is a simplified block diagram illustrating an exemplary locker involved in pre-staged transactions, consistent with exemplary aspects of certain embodiments of the present disclosure. In FIG. 2B, an illustrative locker 250 (a unit of the plurality of lockers 202) and associated components involved in enabling the locker 250 to allow the user to perform a pre-staged transaction are shown. In some embodiments, the locker 250 and associated components may be manufactured into an integral unit of a locker. In the embodiment shown in FIG. 2B, the locker 250 may include a processor 252, memory 253 such as RAM, computer-readable media 254, and/or any input and/or output device 258, including one or more components such as a touchscreen display, a PIN pad, a speaker, a Microphone, a tactile input, and the like. The memory 253 may store code that, when executed by processor 252, may cause processor 252 to implement one or more aspects of various operations and schemes relating to performing a pre-staged transaction via the locker herein, including one or more of those involving: (1) facilitating the locking and unlocking the locker 250 in response to verified locker credential (e.g., passcode, pin) and/or other information; (2) communicating with sensors, network communications devices, and the like, to record, track, and update a status associated with the locker and the pre-staged transaction associated with the locker 250; (3) communicating with cameras, biometric sensors, network communications devices, and the like, to authenticate the user prior to allowing access thereto; (4) actuating the locker 250 in response to operations of an operator of the locker (e.g., a bank teller, backroom automation mechanisms such as the robotic arm 204 of FIG. 2A) to, for example, prepare the locker for access and fulfillment by the user, remove items in the locker when the user misses the assigned time window to access the locker, and collect items deposited by the user in the locker in a pre-staged transaction; (5) tracking the operator's activities when accessing the locker 250, for instance, when in preparing the locker to be utilized to perform the pre-staged transaction by the user, and/or when in emptying the locker to prepare for other pre-staged transactions: and (6) providing ATM roller like capabilities to accurately count cash bills upon dispensing from the locker to the user, among others.

In some embodiments, a battery source 262, such as a lithium-ion battery or rechargeable battery along with a photovoltaic device, may be used to power the locker 250. A lock bolt sensor 264 may be used to sense positions of a lock bolt of a securable device, such as an electronic locking component. A solenoid 282 may include an electro-mechanical mechanism for engaging and disengaging to lock a securable device in response to the locker 250 applying and removing an electric charge. An alarm sensor 284 may be configured to sense an action, such as a locker door being opened when the locker 250 is in a locked state, the user entering an unverifiable locker credential, the user failing being authenticated at the locker, and so on. A tamper sensor 268, such as motion and/or light sensor, may be configured to sense whether a securable device is tampered with while the securable device is in a locked state.

In some embodiments, the locker 250 may include a Bluetooth component 265 to enable communication with a mobile device of the user or operator when accessing the locker 250. An NFC components 286 may also be included at the locker 250 to communicate with another NFC-enabled device, such as the mobile device 160, transaction card 110, for use in exchanging data such as locker access code, payment token, authentication token, mobile device information, and so on. In one embodiment, an RFID reader may be included with the locker 250 for reading RFID signals generated by the transaction card 110 that may be used to unlock and lock the securable device of the locker 250.

In some embodiments, the locker 250 may include one or more cameras 256 to perform various operations involved in performing the pre-staged transaction at the locker 250. In some instances, the camera 256 may be configured to perform facial recognition of the user/operator accessing the locker 250. In this sense, the camera is utilized as a specialized biometric sensory device. In other instances, the camera 256 may be configured to intake information provided by the user or operator upon accessing the locker. In one example, the camera 256 may be configured to scan QR codes or other graphic codes/token provided by the user or operator in order to access the locker 250. In other instances, the camera 256 may be configured inside the compartment of the locker 250 to enable monitoring of the content disposed of therein. In one example, the camera 256 may be configured to record the image of a replacement debit card disposed of in the locker 250 for user retrieval.

In some embodiments, the locker 250 may include one or more various biometric sensors 266 (and sensor circuitries) to facilitate monitoring, and authentication of the user/operator accessing the locker 250. Here, for example, such sensors and sensor circuitries may include fingerprint sensors and/or biometric sensors including one or more of in-display sensors, capacitive sensors, optical sensors, blood and/or heart based sensors (e.g., blood flow, pulse, heart rate, etc.), infrared sensors, integrated sensors such as those buried beneath a coating or layer, covered sensors (e.g., ceramic, glass, sapphire, etc.), coated or hard coating sensors, and/or other fingerprint and biometric sensors, such as traditional fingerprint sensors. Examples of some such sensors are those manufactured by Goodix Technology Co., Ltd.

In some embodiments, one or more biometric sensors 266 may include one or more devices capable of sensing the environment around locker 250, movement of the user/operator, and/or other detectable interactions involving the locker 250. In some embodiments, such biometric sensors 266 may include, for example, one or more of a camera, an optical sensor, a microphone, a gyroscope, an accelerometer, a shock sensor, a position sensor, a light sensor such as an ambient light sensor, a temperature sensor, a touch sensor, a conductivity sensor, and/or a haptic sensor. In some embodiments and, optionally, in combination of any embodiment described above or below, at least one environmental condition may be one of: temperature, humidity, vibration, shock, sound, light, presence of air contaminant, acceleration, pH, location, presence of at least one odor, presence of at least one gas (e.g., volatile organic compounds (VOC), nitrogen, ozone, CO2), air pressure, and any combination thereof. For example, the gas sensors may measure one or more of ethylene, ammonia, acetylene, nitrogen, carbon dioxide, oxygen.

In some embodiments, the locker 250 may also include one or more sensors in the form of buttons, switches, other tactile input mechanisms, or other forms of user-derived input for receiving an indication or instruction from the user/operator. In some examples, such one or more sensors allow the user/operator to silently trigger an alarm to the server 101 in the scenarios of coerced access to the locker 250.

In some embodiments, the locker 250 may further be configured to include one or more sensors/components for counting cash bills dispensed into and from the locker 250. In some examples, light sensors, weight sensors, and other mechanical components may be configured at the locker 250 to count the cash bills transacted thereat. In this sense, the locker 250 may function as a mini-ATM to accurately keep a record of the amount of cash disposed of into the locker 250 (e.g., the amount deposited), as well as dispensed out the locker 250 (e.g., the amount withdrawn).

According to certain aspects of the disclosure, in operation, the locker 250 may update a local data structure stored in the memory 253 that indicates whether the locker is available based on the status of the locker. The locker 250 may also transmit, to a server (e.g., server 101 of FIG. 1), a message indicating that the locker 250 has been unlocked, locked, tampered with, as well as a message updating the status of the pre-staged transaction from a first status (e.g., pending) to a second status (e.g., completed, deposited pending operator action, disputed), upon the locker being accessed by the user and/or the operator. In turn, the server may be configured to update a database to track the course of progression for the pre-staged transaction.

Figure 3A:
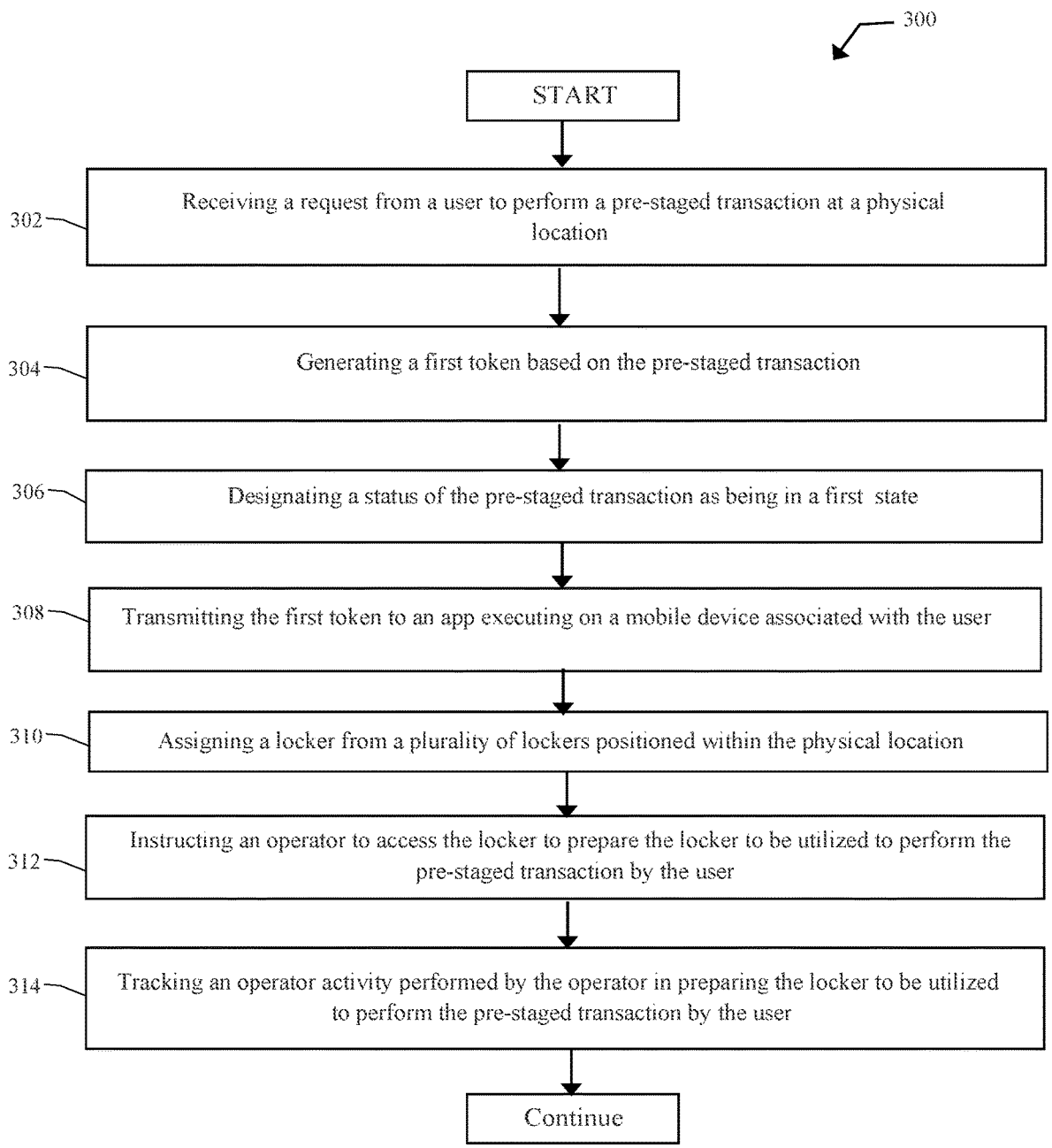
FIGS. 3A-3B are a flowchart illustrating an exemplary process related to providing pre-staged transactions via lockers, consistent with exemplary aspects of certain embodiments of the present disclosure.
Figure 3B:
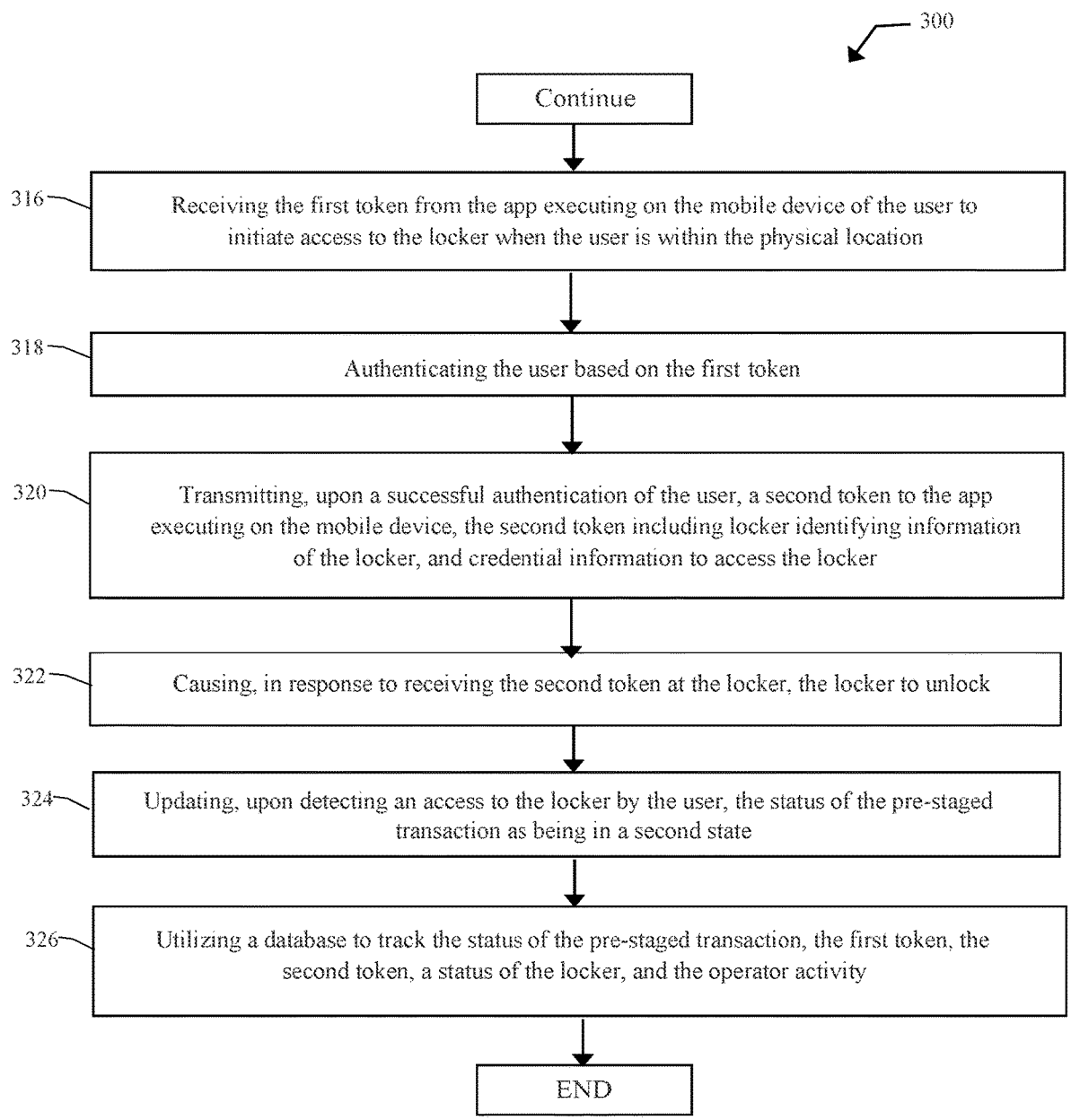

FIGS. 3A-3B are a flowchart illustrating an exemplary process 300 related to providing pre-staged transactions via lockers, consistent with exemplary aspects of at least some embodiments of the present disclosure. Referring to FIGS. 3A-3B, the illustrative performing a pre-staged transaction at a locker, process 300 may comprise: receiving a request from a user to perform a pre-staged transaction at a physical location, at 302; generating a first token based on the pre-staged transaction, at 304; designating a status of the pre-staged transaction as being in a first state, at 306; transmitting the first token to an app executing on a mobile device associated with the user, at 308; assigning a locker from a plurality of lockers positioned within the physical location, at 310; instructing an operator to access the locker to prepare the locker to be utilized to perform the pre-staged transaction by the user, at 312; tracking an operator activity performed by the operator in preparing the locker to be utilized to perform the pre-staged transaction by the user, at 314; receiving the first token from the app executing on the mobile device of the user to initiate access to the locker when the user is within the physical location, at 316; authenticating the user based on the first token, at 318; transmitting, upon successful authentication of the user, a second token to the app executing on the mobile device, the second token including locker identifying information of the locker, and credential information to access the locker, at 320; causing, in response to receiving the second token at the locker, the locker to unlock, at 322; updating, upon detecting an access to the locker by the user, the status of the pre-staged transaction as being in a second state, at 324; and utilizing a database to track the status of the pre-staged transaction, the first token, the second token, a status of the locker, and the operator activity, at 326. In some embodiments, the performing pre-staged transaction process 300 may be performed by the server 101. In other embodiments, the performing pre-staged transaction process 300 may be carried out, in whole or in part, in conjunction with a server, and/or a mobile device that is connected via one or more networks to the server, which is executing instructions for performing one or more steps or aspects of various embodiments described herein.

In some embodiments, performing a pre-staged transaction process 300 may include, at 302, a step of receiving a request from a user to perform a pre-staged transaction at a physical location. According to various aspects of the innovation, the request may be sent by the user via an application (app) having instructions executable in connection with allowing the user to pre-stage transactions. In some embodiments, the request may be sent as part of the details related to pre-staging a transaction. In other embodiments, the request may be sent as a modification to a pending pre-staged transaction such that the fulfillment modality may be changed to a locker instead of a previously pre-staged fulfillment device. In implementations, step 302 may be performed by a computing device, such as a computing device associated with the server 101 and/or at least one entity involved with transactions pre-staged. Such entity may be a financial institution such as a bank, credit card issuer, or any other type of financial service entity that generates, provides, manages, and/or maintains financial service accounts for one or more customers.

In the exemplary embodiment illustrated in FIGS. 3A-3B, the performing a pre-staged transaction process 300 may include, at 304, a step of generating a first token based on the pre-staged transaction. According to various aspects of the innovation, the first token may comprise: a transaction detail of the pre-staged transaction, an operator identifier identifying an operator handling the request, at least one first authentication factor associated with the user, and an expiration time. In some embodiments, the first token may be generated in the form of a bar code, a QR code, a series of numbers and letters, a symbol, an animation, and the like.

The performing a pre-staged transaction process 300 may include, at 306, a step of designating a status of the pre-staged transaction as being in a first state. According to certain aspects of the embodiment, as a transaction is split into at least two phases of a pre-staging phase and a fulfillment stage (or a further transaction stage), each phase of the pre-staged transaction has a corresponding state associated therewith. As such, a pre-staged transaction may be in a pending state, a completed state, an expired state, a canceled state, a disputed state, a to-be-complete-by-operator state, and so on. In some embodiments, the first state indicates a pending state for the pre-staged transaction.

The performing a pre-staged transaction process 300 may include, and at 308, a step of transmitting the first token to an app executing on a mobile device associated with the user. In some embodiments, the first token is valid prior to the expiration time, when the user is outside of the physical location when the first token is transmitted to the app. In some instances, the first token may be transmitted in at least two parts to the user. In other embodiments, the first token is transferrable to another user via various messaging tools.

The performing a pre-staged transaction process 300 may include, and at 310, a step of assigning a locker from a plurality of lockers positioned within the physical location. In some embodiments, each of the plurality of lockers is associated with a status of availability at a different point of time. In some examples, even when at the time when the transaction is pre-staged, a locker is in an unavailable state, the locker can still be assigned based on the expiration time included in the first token, which indicates a later pick-up time when the locker will become available.

The performing a pre-staged transaction process 300 may include, and at 312, a step of instructing the operator to access the locker to prepare the locker to be utilized to perform the pre-staged transaction by the user; and at 314, a step of tracking an operator activity performed by the operator in preparing the locker to be utilized to perform the pre-staged transaction by the user. As above-described in connection with FIG. 2A, according to various embodiments, the operator handling the pre-staged transaction may be a human operator, automation, or a combination thereof. In some embodiment, the operator may access the locker in a manner different than the user accessing the locker. For instance, the operator may access the locker with a master passcode from a back entrance of the locker; while the user may access the locker with a one-time passcode, sometimes with a secondary authentication at the locker, to access a front entrance of the locker. In various examples, the locker may be prepared by the operator to stage various transactions including, but not limited to, providing a replacement debit card, a replacement credit card, an amount of cash bills, a cashier's check, and the like. In terms of tracking the activities of the operator, the process 300 may be configured to record the time, location, locker identification information, in association with the identity information of the operator and the pre-staged transaction the operator handles.

The performing a pre-staged transaction process 300 may include, and at 316, a step of receiving first token from the app executing on the mobile device of the user to initiate access to the locker when the user is within the physical location; at 318, a step of authenticating the user based on the first token: and at 320, a step of transmitting, upon successful authentication of the user, a second token to the app executing on the mobile device, the second token including locker identifying information of the locker, and credential information to access the locker. In some embodiments, various presence detection techniques may be utilized to detect the user's presence at the physical location. For instance, the GPS location information, Bluetooth signals, and the manual indication as a result of the user checks in at the app on the mobile device, the user checks in at a kiosk at the physical location using a transaction card, an ID card, a mobile device, and the like. When the user is within the physical location, the first token may be transmitted from the app on the mobile device of the user to the computing device (e.g., server 101) to initiate a second phase of the pre-staged transaction to access the locker. In various embodiments, the user may be authenticated based on the first token and/or other authenticating factors such as an ID card, a transaction card, a one-time passcode sent to the mobile device of the user.

According to exemplary embodiments, upon successful authentication of the user, a second token is sent to the app executing on the mobile device to inform the user with the locker accessing information such as the locker number, the locker credential information to access the locker (e.g., a pin, a passcode, a QR code, a bar code, etc.). In other embodiments, the second token further comprises at least one second authentication factor. As such, the user may be further authenticated based on the at least one second authentication factor at the locker. Various conditions may trigger the second token to include the at least second authentication factor. For example, the amount of cash withdrawal, the pick-up time window, the historical transaction with the account of the user, and the like. In one example, the at least one second authentication factor may comprise a transaction card of the user.

The performing a pre-staged transaction process 300 may include, and at 322, a step of causing, in response to receiving the second token at the locker, the locker to unlock; at 324, a step of updating, upon detecting an access to the locker by the user, the status of the pre-staged transaction as being in a second state; and at 326, a step of utilizing a database to track the status of the pre-staged transaction, the first token, the second token, a status of the locker, and the operator activity. In some embodiments, the second state of the transaction may depend on the performance of the pre-staged transaction by the user when accessing the content disposed of inside the locker. In one example, the second state is a complete state when the user retrieves the items inside the locker and confirms that everything is right. In another example, the second state is a disputed state when the user retrieves the items inside the locker and discovers that the transaction is not properly staged (e.g., the amount of cash bills is not right, the name on the replacement card is not right, etc.) In implementations, the app executing on the mobile device of the user may be utilized to enter or confirm the second state of the pre-staged transaction. In various embodiments, one or more of the status of the pre-staged transaction, the first token, the second token, the locker, and the operator activity may be recorded into a database associated with the computing device.

In some embodiment, the user may perform a pre-staged transaction in a manner that the operator accesses the locker subsequent to the user's access to the locker. In some instances, the user may deposit an amount of cash bill at a locker (after pre-staging a deposit transaction with the specified amount), and the operator is instructed to access the locker and fetch the cash bills in due time to complete the pre-staged transaction. In the first phase of this type of pre-staged transaction, the status of the transaction may be pending (or pending operator action); and at the end of the second phase, upon the operator accessing the locker, the status of the transaction may be complete, or complete pending confirmation.

Figure 3C:
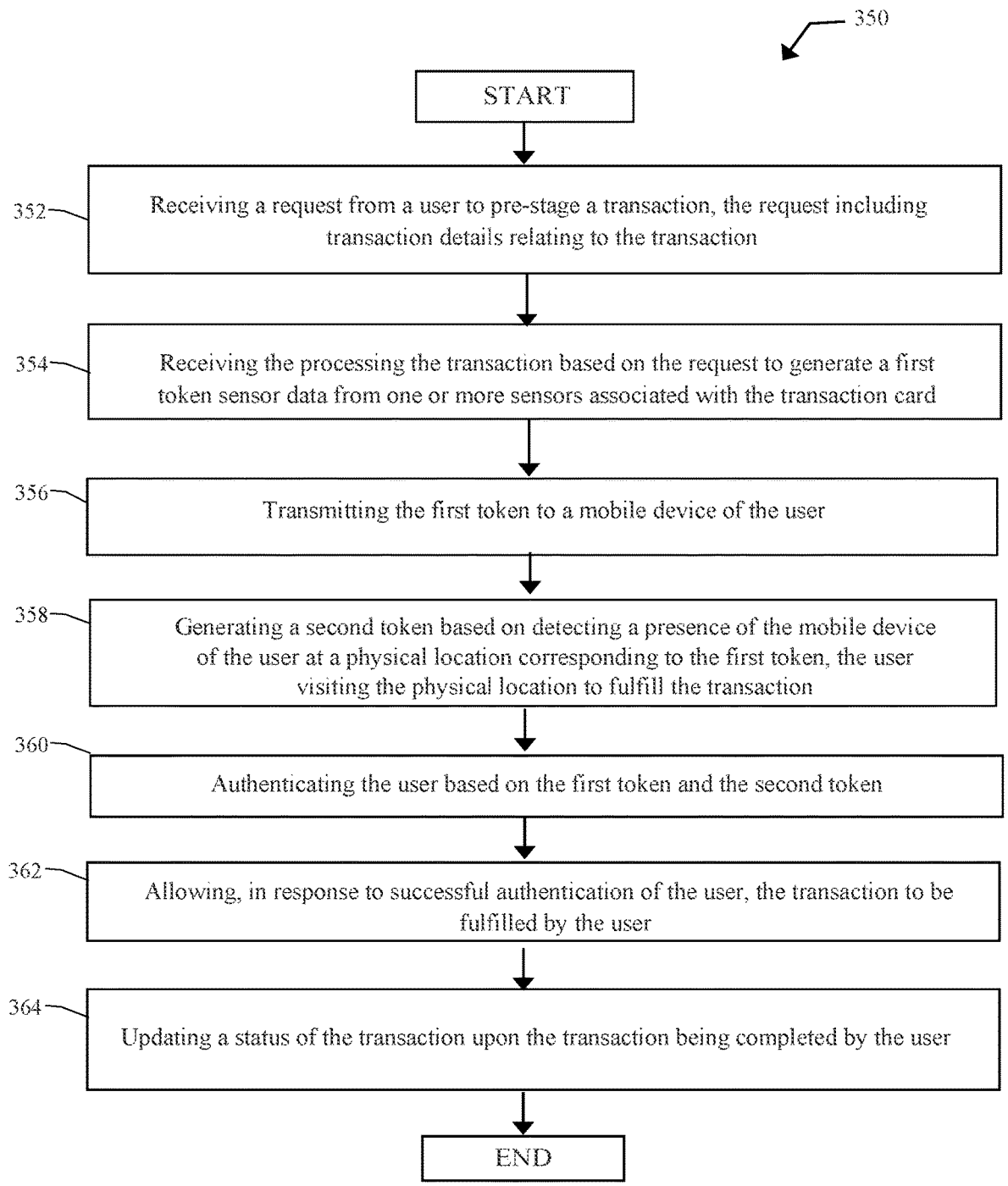
FIG. 3C is a flowchart illustrating an exemplary process related to pre-staging transactions, consistent with exemplary aspects of certain embodiments of the present disclosure.

FIG. 3C is a flowchart illustrating an exemplary process 350 related to pre-staging transactions, consistent with exemplary aspects of at least some embodiments of the present disclosure. Referring to FIG. 3C, the illustrative pre-staging transactions process 350 may comprise: receiving a request from a user to pre-stage a transaction, the request including transaction details relating to the transaction, at 352; processing the transaction based on the request to generate a first token, at 354; transmitting the first token to a mobile device of the user, at 356; generating a second token based on detecting a presence of the mobile device of the user at a physical location corresponding to the first token, the user visiting the physical location to fulfill the transaction, at 358; authenticating the user based on the first token and the second token, at 360; allowing, in response to successful authentication of the user, the transaction to be fulfilled by the user, at 362; and updating a status of the transaction upon the transaction being completed by the user, at 364. In some embodiments, the pre-staging transactions process 350 may be performed by the server 101. In other embodiments, the pre-staging transactions process 350 may be carried out, in whole or in part, in conjunction with a server, and/or a mobile device that is connected via one or more networks to the server, which is executing instructions for performing one or more steps or aspects of various embodiments described herein.

In the example embodiment shown in FIG. 3C, the pre-staging transactions process 350 may include, and at 352, a step of receiving a request from a user to pre-stage a transaction, the request including transaction details relating to the transaction; at 354, a step of processing the transaction based on the request to generate a first token; and at 356, a step of transmitting the first token to a mobile device of the user. According to various aspects of the innovation, the transaction details may include information such as the user identity information, the user account information, the requesting date and time, the transaction type and amount, and the user's choice of a pre-staged date, a time, a location, a fulfillment device, and a fulfilling user. In some embodiments, the first token may include data elements identifying at least: a transaction detail of the transaction, an operator identifier identifying an operator handling the request, at least one first authentication factor associated with the user, and an expiration time. In other embodiments, the first token may further identify a modality for the transaction as being one or more of: an ATM, an operator device, and a locker. In implementations, step 352 may be performed by a computing device, such as a computing device associated with the server 101 and/or at least one entity involved with transactions pre-staged. Such entity may be a financial institution such as a bank, credit card issuer, or any other type of financial service entity that generates, provides, manages, and/or maintains financial service accounts for one or more customers.

In some embodiments, the request to pre-stage a transaction may be generated by the user via an app executing on a computing device (e.g., the computing device 109 of FIG. 1, the mobile device 160 of the user). In other embodiments, the request is generated based on historical transactions with an account by the user. In the second scenario, the app executing on the computing device of the user may be further configured to monitor the user's historical transactions, pre-staged or not, and use techniques such as machine learning algorithms to recommend transactions to be pre-staged for the user. For instance, the app may be configured to recommend to pre-stage a transaction of cash withdrawal on a certain date based on the learned habits of the user used to schedule one right before a baseball game in town, and the user just purchased tickets for the baseball game. In this case, once the user approves transaction, the request is sent to pre-stage the recommended transaction. In other examples, the app may be configured to dynamically recommend transactions based on context such as events scheduled on the user's calendar, weather conditions, travel plans, emergency alerts (fire evacuation orders), independently from the context gleaned from the user's past behaviors.

In some embodiments, the operator may be enabled to modify a user's choice of fulfillment device included in the pre-staging request, or designate a fulfillment device in the absence of a user's choice of the same. For instance, when the user pre-stages to cash a check of a large amount of funds at the counter, the operator who handles the request may be enabled to shift the pre-staged transaction to an ATM instead, to prevent and thereby shifting the risks at the cash box to the ATM. As a result, the user will be notified at the mobile device (e.g., push notification, SMS text, chat app text) about the changes made to the pre-staged transaction.

In some embodiment, the request to pre-stage a transaction may be generated by the user who will fulfill the pre-staged transaction at a later point. In other embodiments, the request to pre-stage a transaction may be generated by the user other than the one who will visit the physical location to fulfill the pre-staged transaction. For example, a grandson may pre-stage multiple transactions involving a check deposit to his grandmother's account. In implementations, the grandson may be authorized with rights to pre-stage transactions with other's account without being given access to the full login credential of the other's account. In this example, when the grandmother visits the physical location with a check, she can simply hand over the check at the counter (or at an ATM), to initiate performing the pre-staged transaction.

In some embodiments, the at least one data element of the first token may be modifiable by the user via the app executing on the mobile device, prior to the expiration time lapses. For instance, the user may operate the app to update the pick-up time window, to change a physical location for performing the pre-staged transaction, to designate a different fulfilling user, and/or to shift to a different fulfillment device for performing the pre-staged transaction.

In some embodiments, the pre-staging transactions process 350 may further include a step of reminding the user of the pre-staged transaction. Such a reminder for the transaction may be transmitted to the mobile device of the user, the reminder comprising a user interface operable by the user to modify information associated with the first token. In one example, the user interface may be configured to include a "bump 15 minutes" button to enable the user to push the pick-up window further out when the user is on the way but running late. Further details regarding an exemplary reminder are described with connection to FIGS. 4B-4C, below. In some embodiments, the reminder may be generated based on geo-location information of the mobile device of the user within a pre-configured time window prior to the expiration time. In some examples, the pre-configured time window starts at a fixed amount of time before the expiration time when the first token is valid. For instance, the pre-configured time window can be designed to always start 20 minutes in advance of the expiration time, specified as a default value or by the user. In other examples, the time window may also be pre-configured based on a context associated with the user, such as a geo-location of the user. In some embodiments, the geo-location may be determined based on one or more of: a calendar event associated with the user, a weather condition in an area associated with the user, and a traffic condition associated with the user. Based on the determined geo-location of the user and other environmental contexts (e.g., traffic, weather), a modification (e.g., how many minutes to bump) to the pre-staged transaction may be automatically recommended and offered to the user via the user interface. In other embodiments, the app executing on the mobile device of the user may also be configured to detect the context relating to fulfilling the pre-staged transaction and recommend modifications thereto to the user for transmission.

The pre-staging transactions process 350 may include, and at 358, a step of generating a second token based on detecting a presence of the mobile device of the user at a physical location corresponding to the first token, the user visiting the physical location to fulfill the transaction; and at 360, a step of authenticating the user based on the first token and the second token.

Various techniques may be utilized to detect the presence of the user at the physical location, without limitation. For instance, embodiments herein may be configured such that the detection of the presence of the wireless device of the user or the user at the physical location may comprise one or more of: displaying first scannable information on a display screen of a kiosk at the location and receiving an indication that the first scannable information is scanned by the wireless device; receiving a verified login by the user at the kiosk at the location; receiving a swipe of card event from the user at the location; detecting a geo-location associated with the wireless device indicating that the wireless device (and therefore the user) is at the location; and/or detecting a wireless signal (e.g., Bluetooth, NFC, Wi-Fi) transmitted from the wireless device indicating that the wireless device is at the location.

The pre-staging transactions process 350 may include, and at 362, a step of allowing, in response to successful authentication of the user, the transaction to be fulfilled by the user; and at 364, a step of updating the status of the transaction upon the transaction being completed by the user. In some embodiments, once authenticated, the user may be enabled to access the pre-staged fulfillment device to perform the pre-staged transaction. For example, the user may access a locker, an ATM, or interact with a teller to complete or further transact the pre-staged transaction.

Figure 4A:
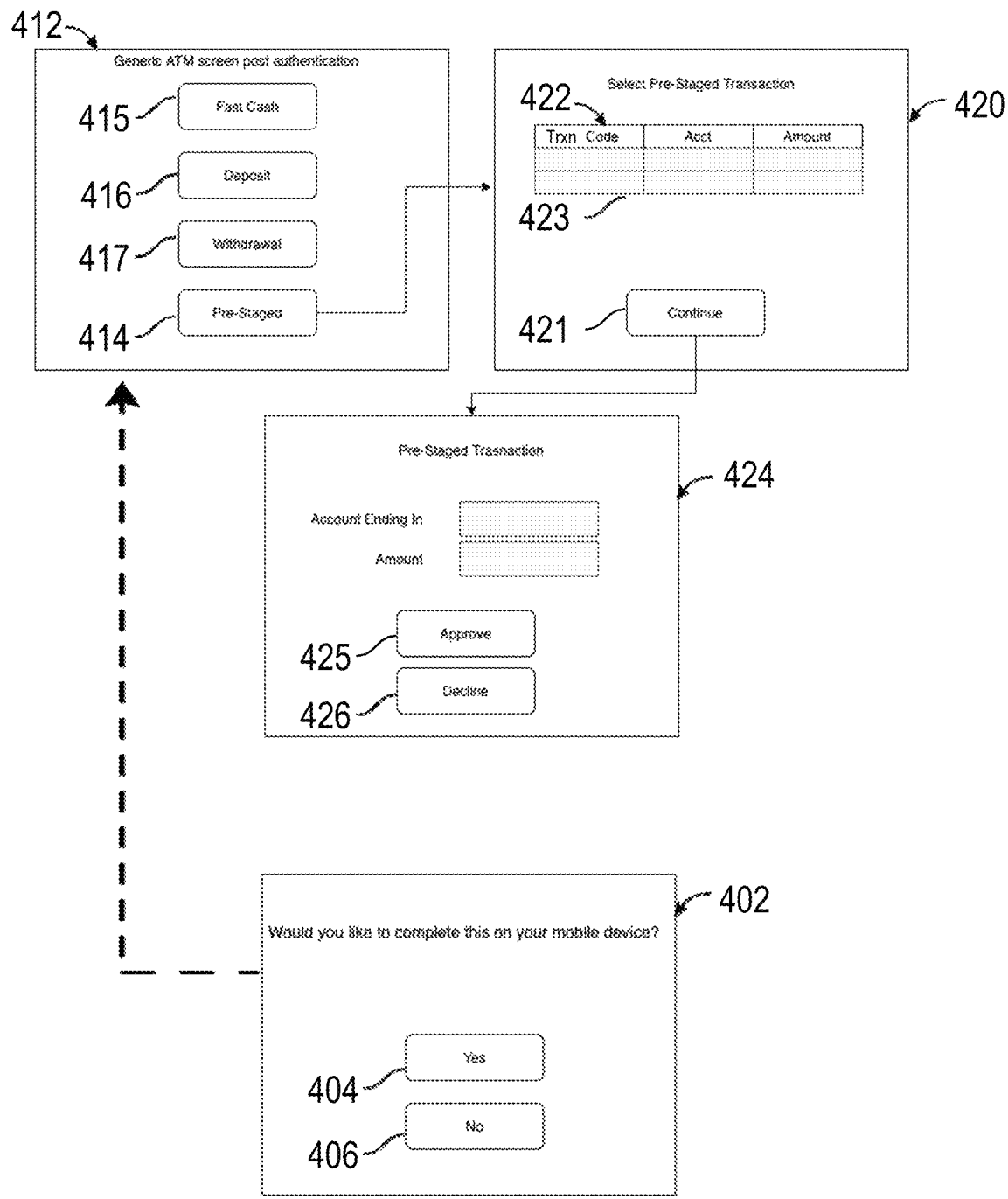
FIGS. 4A-4C are diagrams depicting exemplary graphical user interfaces (GUIs) associated with pre-staged transactions, in accordance with certain embodiments of the present disclosure.

FIG. 4A is a diagram illustrating a series of exemplary graphical user interfaces involving an ATM as a fulfillment device, in accordance with one or more embodiments of the present disclosure. In some embodiments and as illustrated in more details with connection to FIGS. 4B-4C below, once the user arrives at the physical location, the user would still need to authenticate himself or herself before being able to fulfill the pre-staged transaction at the ATM. In some embodiments, the user may be able to perform the authentication based on the authentication factor indicated in the first token transmitted to the user upon processing of the request to pre-stage the transaction. In some embodiments, upon detecting the user's presence at the physical location, as well as the context that a respective transaction has been pre-stage be fulfilled at the same physical location, a second token may be transmitted to the mobile device of the user. In this scenario, the user may be required to perform the authentication based on both the first token and the second token. In some examples, the user can authenticate using a bank issued transaction card (e.g., debit card, credit card, presto card, virtual card) and a pin associated therewith. In other examples, the customer can authenticate using other suitable techniques such as biometric sensory data based authentication including, facial recognition, fingerprint recognition, iris recognition, and the like.

In this embodiment, upon successful authentication at the ATM (e.g., the fulfillment device), an option to use the mobile device to pair with the ATM to fulfill/unlock the staged transaction may be provided via an ATM user interface (UI) 402. As shown in the ATM UI 402, e.g., displayed on an ATM screen, one or more graphical elements or options prompting the user as to whether or not to continue the pre-staged transaction on the mobile device or the ATM are presented. In the example shown in FIG. 4A, upon selecting a "Yes" button 404 of the ATM UI 402, the user may migrate the subsequent UIs to the mobile device, thereby fulfilling the transaction at the mobile device. On the other hand, upon selecting a "No" button 406 of the ATM UI 402, the user may continue to interact with the ATM to fulfill the transaction.

In the exemplary embodiment shown in FIG. 4A, once the user chooses to stay with the ATM screen via the UI 402, an ATM UI 412 may be configured such that a "Pre-staged" button 414 is displayed thereat, in addition to the generally accessible menu options such as a "Fast Cash" button 415, a "Deposit" button 416, and a "Withdrawal" button 417. In implementations, such an additional menu item may be configured, as shown herein FIG. 4A, as an additional button; an overlay superimposing on the initial regular screen display of the ATM upon login; or other suitable techniques. When the user selects the "Pre-staged" button 414, the UI 412 navigates to UI 420. The UI 420 is configured to display the information regarding the pre-staged transactions for the user. As illustrated in this example, the UI 420 displays two pre-staged transactions in a table 422. Also in this example, for each transaction displayed, the table 422 further presents to the user the details such as a transaction code (Trxn Code), an account number which the pre-staged transaction is associated with, and an amount pertaining to the pre-staged transaction; as well as a "Continue" button 421 to allow the user to fulfill the selected pre-staged transaction. In some embodiments, the pre-staged transaction displayed in the table 422 pre-populated with the transaction information is no longer editable. As shown herein, upon the selection of a pre-staged transaction 423 from the table 422 and the "Continue" button 421, the UI 420 navigates to UI 424, in which the details regarding the selected pre-staged transaction 423 is displayed. Further, the UI 424 is also configured to provide an "Approve" button 425 and a "Decline" button 426. As such, the user is no longer able to modify the pre-staged transaction (e.g., modify the amount, the account against which the transaction is staged, etc.). At this point of time, the user can either select the "Approve" button 425 to approve and thereby complete the pre-staged transaction; or select the "Decline" button 426 to cancel the pending pre-staged transaction. Once completing the pre-staged transaction, the user is able to perform additional regular transactions at the ATM.

In the scenarios where the user chooses at ATM UI 402 to use the mobile device to perform the pre-staged transaction, the user may be presented with a series of similar UIs as above-described on the mobile phone to fulfill the pre-staged transaction. In some embodiments, the user similarly no longer is able to modify the pre-staged transactions when choosing to fulfill the pre-staged transactions at the mobile phone. Also similarly, given the pairing between the mobile phone and the ATM, after (or before) performing the pre-staged transaction, the user can perform regular ATM transactions at the mobile device.

In some embodiments, if the user wishes to change the pre-staged transaction, the user may decline the transaction at the ATM, or on the mobile device, when navigating to a UI such as the UI 424 as illustrated in FIG. 4A. Upon the user's selection of the "Decline" button 426 of UI 424, the pre-staged transaction transitions back to a pre-approved, editable status to allow the user to apply modification thereto. In some embodiments, such modification may be conducted via a UI (not shown) at the ATM, or a UI at the mobile phone. In other embodiments, such modification may only be conducted using the original device with which the pre-staged transaction is requested. In one embodiment, once the user updates the pre-staged transaction, the pre-staged transaction is re-queued into the system for processing from scratch (e.g., as a new incoming pre-staging request). In one example, the user may also modify the pre-staged transaction to request to consult with a teller about the pre-staged transaction. In another example, the user may be provided with an option to consult with a teller about the pre-staged transaction once selecting (e.g., clicking on the "Pre-staged" button 414 of UI 412) the option to further transact the pre-staged transaction.

Figure 4B:
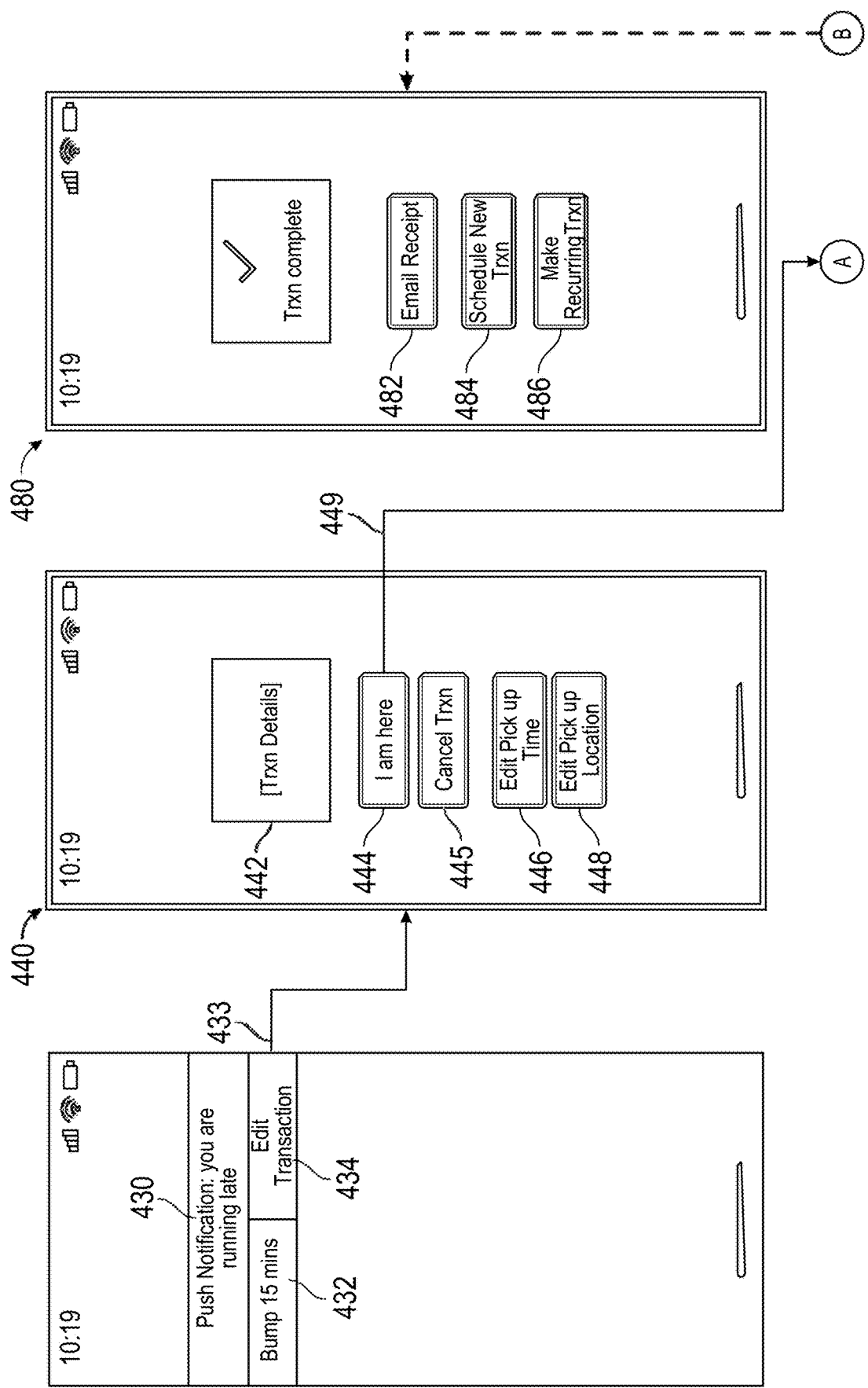
Figure 4C:
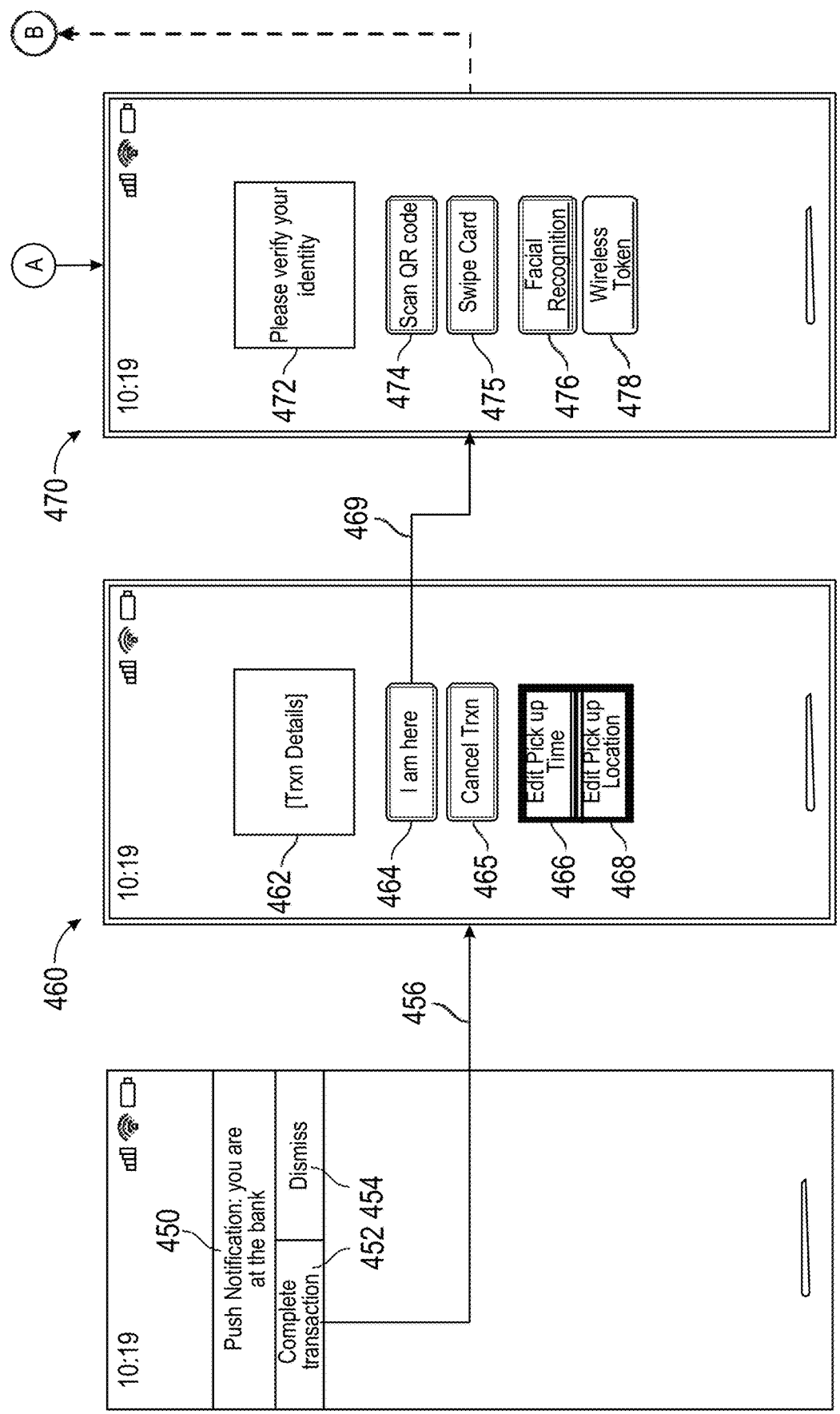

FIGS. 4B-4C depict a series of exemplary graphical user interfaces associated with pre-staged transactions, consistent with exemplary aspects of certain embodiments of the present disclosure. In the exemplary embodiment as illustrated in FIGS. 4B-4C, a user interacts with a series of UIs of an app executing on the mobile phone of the user to perform various operations with regard to a pre-stage transaction. In the first example user interface shown, the user receives a reminder 430 in the format of a push notification, when it is determined that the user may be arriving at the physical location later than the expiration time associated with the pre-staged transaction. Details regarding various conditions upon which such a reminder is generated are described with connection to FIGS. 3A-3C, above. Here, the reminder 430 displays a "Bump 15 mins" button 432, as well as an "Edit Transaction" button 434. In one embodiment, the selection of the "Bump 15 mins" button 432 allows the user to automatically postpone the expiration time associated with the pre-stage transaction by 15 minutes, without selecting the "Edit Transaction" button 434 to engage a full-blown transaction modification page to further delay the expiration time associated with the pre-staged transaction.

Upon selecting the "Edit Transaction" button 434, the user navigates 433 to a page 440 to modify various aspects of the pre-staged transaction. Here, in this example, the page 440 includes a panel 442, an "I am here" button 444, a "Cancel Trxn" button 445, an "Edit Pick up Time" button 446, and an "Edit Pick up Location" button 448. The panel 442 is configured to display details regarding the pre-staged transaction, such as a transaction amount, a transaction account, etc. Since the user is running late in this example, the user may click on the "Cancel Trxn" button 445 to cancel the pre-staged transaction, or click on the "Edit Pick up Time" button 446 to modify the expiration time associated with the pre-stage transaction, or click on the "Edit Pick up Location" button 448 to modify the fulfillment location associated with the pre-stage transaction.

In some embodiments, the user may be provided with the option to manually signal about his or her arrival at the physical location scheduled for fulfilling the pre-staged transaction. In those scenarios, the user may navigate to page 440 and click on the "I am here" button 444 to navigate 449 to an authentication page 470. The authentication page 470 includes various operable UI elements to allow the user to authenticate upon arrival at the physical location. In this example, the authentication page 470 includes a "Please verify your identity" panel 472 informing the user to utilize the options presented below to perform the required authentication prior to completing the pre-staged transaction. As shown herein, the user has the options to click on a "Scan QR Code" button 474 to initiate an authentication procedure based on a QR code submitted from the user, or click on a "Swipe Card" button 475 to initiate an authentication procedure based on the card information provided from the user; or click on a "Facial Recognition" button 476 to initiate an authentication procedure based on scanning facial images of the user; or click on a "Wireless Token" button 478 to initiate an authentication procedure based on the wireless token transmitted from the mobile device of user. In some embodiments, the wireless token may comprise one or both of the first security token and the second security token transmitted to the user upon pre-staging the transaction. In other embodiments, once the user arrives at the physical location, the user may nevertheless interact with an operator (e.g., a bank teller, a clerk (on-site or remote), a bank kiosk, an identity verification device) to perform the identity verification and procedures otherwise required before the user is allowed to fulfill the pre-staged transaction. For example, a bank teller may manually check the ID card of the user, and upon successful verification, manually grant the user access to the fulfillment device (e.g., a locker). Here, the bank teller may also manually instruct the user to provide the first token to a teller device during verification. In some embodiments, the user may choose not to interact with the authentication page 470 on the mobile device and instead communicate with a human operator (or a bank kiosk) to perform the required identify verification. In one example, the authentication page 470 may further include an operable UI element (not shown) to enable the user to initiate or otherwise request a teller (or a bank kiosk) assisted identity varication process before being able to complete the pre-staged transaction.

In other embodiments, the user's presence at the physical location associated with the pre-staged transaction may be detected automatically. In this scenario, a notification 450 is displayed to the user once the user arrives (or otherwise in proximity to) the physical location. In this example, the notification 450 includes a "Complete Transaction" button 452, and a "Dismiss" button 454. If the user selects the "Dismiss" button 454, no further interactions are enabled for the user to perform transactions based on the pre-staged transaction.

On the other hand, if the user selects the "Complete Transaction" button 452, the user navigates 456 to a page 460 to fulfill the pre-staged transaction. As shown in this example, the page 460 includes a panel 462, an "I am here" button 464, a "Cancel Trxn" button 465, an "Edit Pick up Time" button 466, and an "Edit Pick up Location" button 468. The panel 462 is configured to display details regarding the pre-staged transaction, such as a transaction amount, a transaction account, etc. Although the user is present at the physical location in this example, the user may still click on the "Cancel Trxn" button 465 to cancel the pre-staged transaction, or click on the "Edit Pick up Time" button 466 to modify the expiration time associated with the pre-stage transaction, or click on the "Edit Pick up Location" button 468 to modify the fulfillment location associated with the pre-stage transaction.

In some embodiments, in addition to the automatically detected user's presence at the physical location, the user is nevertheless provided with the "I am here" button 464. For instance, the user may click on the "I am here" button 464 to confirm his or her presence and/or intent to be present to complete the pre-stated transaction. As shown herein, upon clicking on the "I am here" button 464, the user navigates 469 to the authentication page 470, as described above. Similarly, the user is enabled to interact with the authentication page 470 to perform the required authentication prior to being able to further transact the pre-staged transaction.

In the exemplary embodiment shown in FIGS. 4B-4C, after the user fulfills the pre-staged transaction (via the ATM, locker, teller device, etc.), a page 480 is displayed to the user to follow up with various post-transaction operations. In this example illustrated herein, the page 480 includes a "Trxn complete" indication, an "Email Receipt" button 482, a "Schedule New Trxn" button 484, and a "Make Recurring Trxn" button 486. The user may click on the "Email Receipt" button 482, to email a receipt regarding the completed pre-staged transaction to an email account on file for the user, or click on the "Schedule New Trxn" button 484 to schedule a new transaction, related or unrelated to the completed pre-staged transaction, or click on the "Make Recurring Trxn" button 486 to make the pre-staged transaction a recurring transaction.

Figure 5:
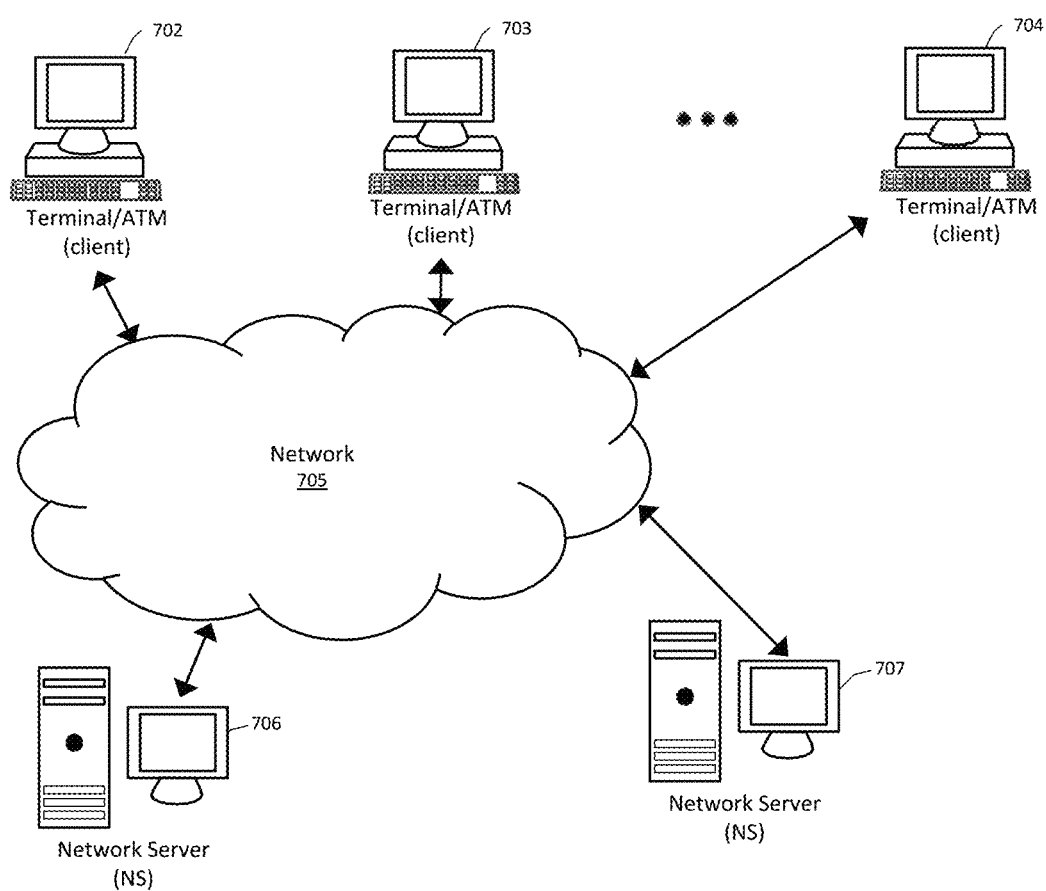
FIG. 5 is a block diagram depicting an exemplary computer-based system and/or platform, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
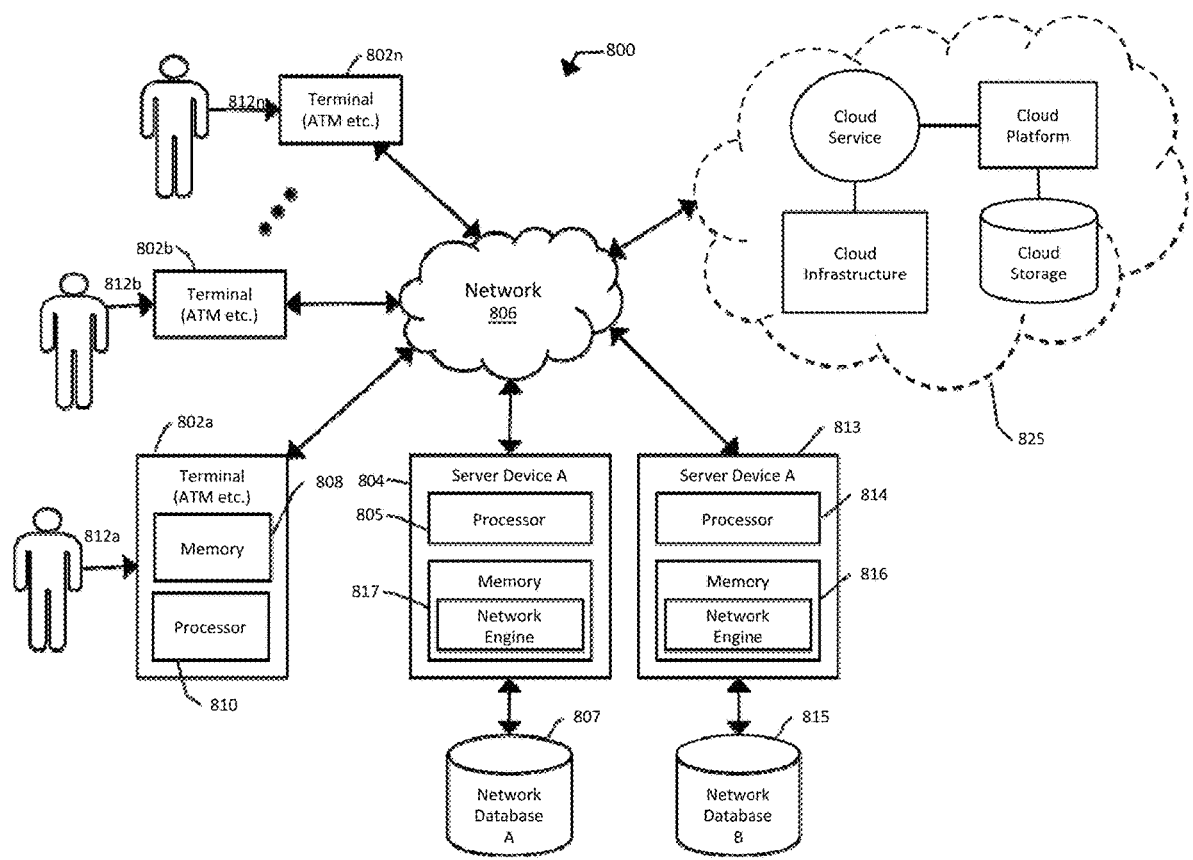
FIG. 6 is a block diagram depicting another exemplary computer-based system and/or platform, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., POS devices) 802a, 802b through 802n shown each at least includes a computer-readable medium, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of member computing device 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806. As shown in FIG. 5, exemplary server devices 804 and 813 may be also coupled to the network 806. In some embodiments, one or more member computing devices 802a through 802n may be mobile clients.

As shown in FIG. 6, exemplary server devices 804 and 813 may be also coupled to the network 806. In some embodiments, one or more member computing devices 802a through 802n may be mobile clients. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
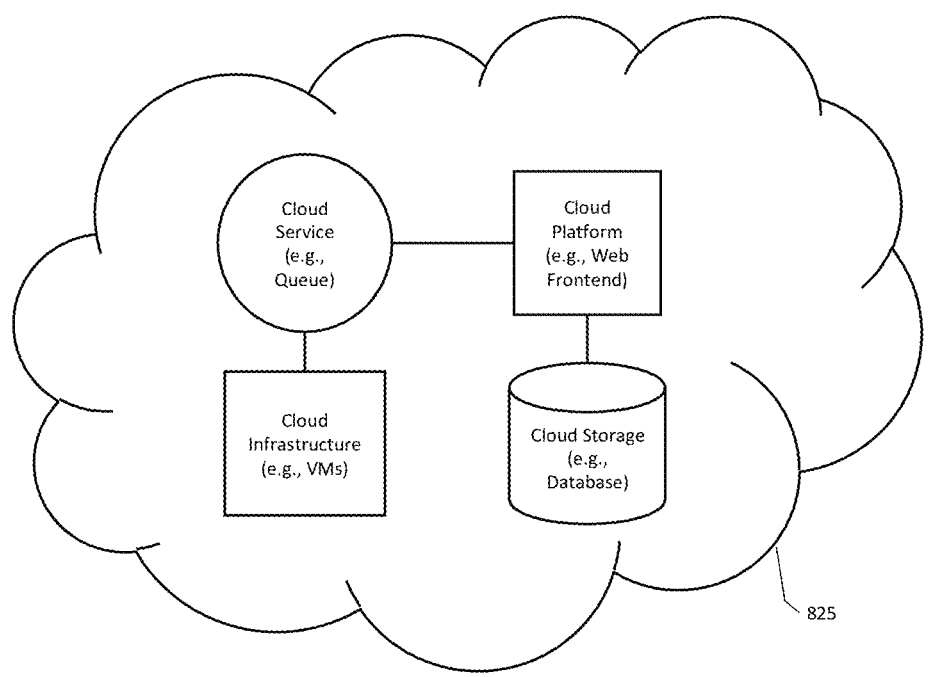
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
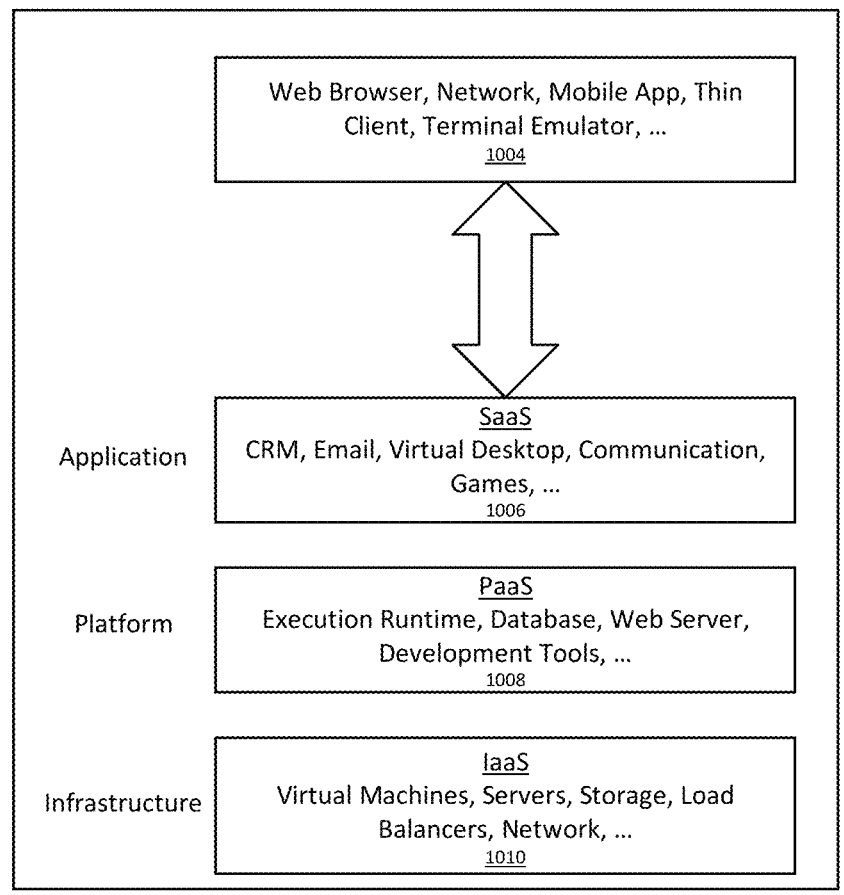

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 7, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 6 and 7 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve various embodiments detailed herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.). Computer-related systems, computer systems, and systems, as used herein, include any combination of hardware and software.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX, (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37)

Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various interactions with an ATM, for example, without limitation, as part of MFA authentication process and/or session interaction, one or more of the following applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
  receiving, by a computing device, a request from a user to perform a pre-staged transaction at a physical location;
  generating, by the computing device, a first token based on the pre-staged transaction, the first token comprising: a transaction detail of the pre-staged transaction, an operator identifier identifying an operator handling the request, at least one first authentication factor associated with the user, and an expiration time;

designating, by the computing device, a status of the pre-staged transaction as being in a first state;

transmitting, by the computing device, the first token to an app executing on a mobile device associated with the user, the first token being valid prior to the expiration time, when the user is outside of the physical location when the first token is transmitted to the app;

assigning, by the computing device, a locker from a plurality of lockers positioned within the physical location;

instructing, by the computing device, the operator to access the locker to prepare the locker to be utilized to perform the pre-staged transaction by the user;

tracking, by the computing device, an operator activity performed by the operator in preparing the locker to be utilized to perform the pre-staged transaction by the user;

receiving, by the computing device, the first token from the app executing on the mobile device of the user to initiate access to the locker when the user is within the physical location;

authenticating, by the computing device, the user based on the first token;

transmitting, by the computing device, upon successful authentication of the user, a second token to the app executing on the mobile device, the second token including locker identifying information of the locker, and credential information to access the locker;

causing, by the computing device and in response to receiving the second token at the locker, the locker to unlock;

updating, by the computing device and upon detecting an access to the locker by the user, the status of the pre-staged transaction as being in a second state; and utilizing, by the computing device, a database to track the status of the pre-staged transaction, the first token, the second token, a status of the locker, and the operator activity.

Clause 2. The method of clause 1 or of any clause herein, wherein the second token further comprises at least one second authentication factor, and the method further comprising:

authenticating, by the computing device, the user based on the at least one second authentication factor at the locker.

Clause 3. The method of clause 1 or of any clause herein, wherein the at least one second authentication factor comprises a transaction card of the user.

Clause 4. A computer-implemented method comprising:
receiving, by a computing device, a request from a user to pre-stage a transaction, the request including transaction details relating to the transaction;
processing, by the computing device, the transaction based on the request to generate a first token, the first token comprising data elements identifying at least: a transaction detail of the transaction, an operator identifier identifying an operator handling the request, at least one first authentication factor associated with the user, and an expiration time;
transmitting, by the computing device, the first token to a mobile device of the user;
generating, by the computing device, a second token based on detecting a presence of the mobile device of the user at a physical location corresponding to the first token, the user visiting the physical location to fulfill the transaction;
authenticating, by the computing device, the user based on the first token and the second token;
allowing, by the computing device and in response to successful authentication of the user, the transaction to be fulfilled by the user; and
updating, by the computing device, a status of the transaction upon the transaction being completed by the user.

Clause 5. The method of clause 4 or of any clause herein, the data elements of the first token further identifying a modality for the transaction as being one or more of: an ATM, an operator, and a locker.

Clause 6. The method of clause 4 or of any clause herein, wherein the request to pre-stage a transaction is generated based on historical transactions with an account by the user.

Clause 7. The method of clause 4 or of any clause herein, further comprising:
transmitting, by the computing device, a reminder for the transaction to the mobile device of the user, the reminder comprising a user interface operable by the user to modify information associated with the first token.

Clause 8. The method of clause 7 or of any clause herein, wherein the reminder is generated based on geo-location information of the mobile device of the user within a pre-configured time window prior to the expiration time.

Clause 9. The method of clause 8 or of any clause herein, wherein the geo-location information is determined based on one or more of: a calendar event associated with the user, a weather condition in an area associated with the user, and a traffic condition associated with the user.

Clause 10. The method of clause 4 or of any clause herein, further comprising:
allowing, by the computing device, the user, via the app executing on the mobile device, to modify at least one data element of the first token.

Clause 11. A system comprising:
a plurality of lockers positioned within a physical location;
one or more processors; and
a memory in communication with the one or more processors and storing instructions that, when executed by the one or more processors, cause the one or more processors to:
receive a request from a user to perform a pre-staged transaction at the physical location;
generate a first token based on the pre-staged transaction, the first token comprising: a transaction detail of the pre-staged transaction, an operator identifier identifying an operator handling the request, at least one first authentication factor associated with the user, and an expiration time;
designate a status of the pre-staged transaction as being in a first state;
transmitting the first token to an app executing on a mobile device associated with the user, the first token being valid prior to the expiration time, when the user is outside of the physical location when the first token is transmitted to the app;
assign a locker from the plurality of lockers;
instruct the operator to access the locker to prepare the locker to be utilized to perform the pre-staged transaction by the user;

track an operator activity performed by the operator in preparing the locker to be utilized to perform the pre-staged transaction by the user;
receive the first token from the app executing on the mobile device of the user to initiate access to the locker when the user is within the physical location;
authenticate the user based on the first token;
transmit, upon successful authentication of the user, a second token to the app executing on the mobile device, the second token including locker identifying information of the locker, and credential information to access the locker;
cause, in response to receiving the second token at the locker, the locker to unlock;
update, upon detecting an access to the locker by the user, the status of the pre-staged transaction as being in a second state; and
utilize a database to track the status of the pre-staged transaction, the first token, the second token, a status of the locker, and the operator activity.

Clause 12. The system of clause 11 or of any clause herein, wherein the second token further comprises at least one second authentication factor, and wherein the instructions further cause the one or more processors to:
authenticate the user based on the at least one second authentication factor at the locker.

Clause 13. The system of clause 12 or of any clause herein, wherein the at least one second authentication factor comprises a transaction card of the user.

Clause 14. The system of clause 11 or of any clause herein, wherein the first token further comprises a modality for performing the pre-staged transaction as being one or more of: an ATM, an operator, and the locker.

Clause 15. The system of clause 11 or of any clause herein, w wherein the request to perform a pre-staged transaction is generated based on historical transactions with an account by the user.

Clause 16. The system of clause 5 or of any clause herein, wherein the instructions further cause the one or more processors to:
transmit a reminder for the pre-staged transaction to the mobile device of the user, the reminder comprising a user interface operable by the user to modify information associated with the first token.

Clause 17. The system of clause 16 or of any clause herein, wherein the reminder is generated based on geo-location information of the mobile device of the user within a pre-configured time window prior to the expiration time.

Clause 18. The system of clause 17 or of any clause herein, wherein the geo-location information is determined based on one or more of: a calendar event associated with the user, a weather condition in an area associated with the user, and a traffic condition associated with the user.

Clause 19. The system of clause 11 or of any clause herein, wherein the instructions further causes the one or more processors to:
allow, via the app executing on the mobile device, the user to modify at least one data element of the first token.

Clause 20. The system of clause 11 or of any clause herein, wherein the second state of the pre-staged transaction is a completed state.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
receiving, by a computing device, from a software application installed on a mobile device associated with a user, an access request to access a locker of a plurality of lockers at a physical location;
wherein the access request comprises a user identifier, identifying the user, and an operator identifier, identifying an operator associated with the physical location;
generating, by the computing device, a first authentication token based on the access request, the first authentication token comprising:
at least one first authentication factor associated with the user, and
an expiration time associated with an expiration of the first authentication token;
wherein the first authentication token is represented in a computer-readable indicia configured to be scanned by a scanning device of a kiosk computer device at the physical location to extract the at least one first authentication factor and the expiration time from the first authentication token;
transmitting, by the computing device, to the software application installed on the mobile device, the first authentication token, the first authentication token being valid prior to the expiration time;
wherein the first authentication token is configured to facilitate to authenticate the user for access to the locker;
receiving, by the computing device, from the kiosk computer device, upon the kiosk device scanning the first authentication token on the mobile device, the first authentication token;
determining, by the computing device, current location data representative of a current location associated with the mobile device;
authenticating, by the computing device, the access request based on:
the first authentication token received from the kiosk computer device,
the current location data indicating the current location being the same as the physical location and
a current time being within the expiration time;
transmitting, by the computing device, via at least one wireless communication, upon successful authentication of the access request, a second authentication token to:
the software application installed on the mobile device and
the locker of the plurality of lockers at the physical location, wherein the locker comprises a processor and at least one controllable lock in communication with the processor;
wherein the second authentication token comprises credential information configured to enable authentication for access to the locker; and
wherein, when the second authentication token is authenticated by the processor of the locker, the transmission of the second authentication token to the locker results in actuating, by the processor of the locker, a lock bolt to unlock a door of the locker so as to allow the user to access an interior of the locker.

2. The method of claim 1, wherein the second token further comprises at least one second authentication factor, and the method further comprising:
authenticating, by the computing device, the user based on the at least one second authentication factor at the locker.

3. The method of claim 2, wherein the at least one second authentication factor comprises a transaction card of the user.

4. The method of claim 1, further comprising:
updating, by the computing device and upon detecting an access to the locker by the user, a status of a pre-staged transaction as being in a second state; and
utilizing, by the computing device, a database to track the status of the pre-staged transaction, the first token, the second token, a status of the locker.

5. A system comprising:
a plurality of lockers positioned within a physical location;
one or more processors; and
a memory in communication with the one or more processors and storing instructions that, when executed by the one or more processors, cause the one or more processors to:
receive, from a software application installed on a mobile device associated with a user, an access request to access a locker of a plurality of lockers at a physical location;
wherein the access request comprises a user identifier identifying the user and an operator identifier identifying an operator associated with the physical location;
generate a first authentication token based on the access request, the first authentication token comprising:
at least one first authentication factor associated with the user and
an expiration time associated with an expiration of the first authentication token;
wherein the first authentication token is represented in a computer-readable indicia configured to be scanned by a scanning device of a kiosk computer device at the physical location to extract the at least one first authentication factor and the expiration time from the first authentication token;
transmit, to the software application installed on the mobile device, the first authentication token, the first authentication token being valid prior to the expiration time;
wherein the first authentication token is configured to facilitate to authenticate the user for access to the locker;
receive, from the kiosk computer device upon the kiosk device scanning the first authentication token on the mobile device, the first authentication token;
determine current location data representative of a current location associated with the mobile device;
authenticate the access request based on:
the first authentication token received from the kiosk computer device,
the current location data indicating the current location being the same as the physical location and a current time being within the expiration time;
transmit upon successful authentication of the access request, via at least one wireless communication, a second authentication token to:
the software application executing installed on the mobile device and the locker of the plurality of lockers at the physical location, wherein the locker comprises a processor and at least one controllable lock in communication with the processor;
wherein the second authentication token comprises credential information configured to enable authentication for access to the locker;
receive the second authentication token from the mobile device via at least one wireless communications;
authenticate the second authentication token based at least in part the second authentication token transmitted by the computing device to the processor of the locker; and
wherein, when the second authentication token is authenticated by the processor of the locker, the transmission of the second authentication token to the locker results in actuating a lock bolt to unlock a door of the locker so as to allow the user to access an interior of the locker.

6. The system of claim 5, wherein the second authentication token further comprises at least one second authentication factor, and wherein the instructions further cause the one or more processors to:
authenticate the user based on the at least one second authentication factor at the locker.

7. The system of claim 6, wherein the at least one second authentication factor comprises a transaction card of the user.

8. The system of claim 5, wherein the first authentication token further comprises a modality for performing a pre-staged transaction associated with the access request as being one or more of:
an ATM,
an operator, and
the locker.

9. The system of claim 5, wherein the access request to perform a pre-staged transaction is generated based on historical transactions with an account by the user.

10. The system of claim 5, wherein the instructions further cause the one or more processors to:
transmit a reminder for access request to the mobile device of the user, the reminder comprising a user interface operable by the user to modify information associated with the first authentication token.

11. The system of claim 10, wherein the reminder is generated based on geo-location information of the mobile device of the user within a pre-configured time window prior to the expiration time.

12. The system of claim 11, wherein the geo-location information is determined based on one or more of: a calendar event associated with the user, a weather condition in an area associated with the user, and a traffic condition associated with the user.

13. The system of claim 5, wherein the instructions further causes the one or more processors to:
allow, via the software application executing on the mobile device, the user to modify at least one data element of the first authentication token.

14. The system of claim 5, wherein the one or more processors is further configured to modify a state of the access request to a completed state.

15. The system of claim 5, wherein the instructions further cause the one or more processors to:

update, upon detecting an access to the locker by the user, a status of a pre-staged transaction as being in a second state; and utilize a database to track the status of the pre-staged transaction, the first token, the second token, a status of the locker.

* * * * *